US007619157B2

(12) United States Patent
Hirota

(10) Patent No.: US 7,619,157 B2

(45) Date of Patent: Nov. 17, 2009

(54) ELECTRONIC KEYBOARD INSTRUMENT AND PROCESSING METHOD OF THE SAME

(75) Inventor: Kenichi Hirota, Shizuoka (JP)

(73) Assignee: Kabushiki Kaisha Kawai Gakki Seisakusho, Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/081,467

(22) Filed: Apr. 16, 2008

(65) Prior Publication Data

US 2008/0257135 A1 Oct. 23, 2008

(30) Foreign Application Priority Data

Apr. 17, 2007 (JP) ............................ 2007-108442

(51) Int. Cl.
*G01P 3/00* (2006.01)

(52) U.S. Cl. ............................ 84/658; 84/687; 84/719; 84/744

(58) Field of Classification Search ....................... None
See application file for complete search history.

(56) References Cited

U.S. PATENT DOCUMENTS 6,297,437 B1 * 10/2001 Ura et al. .................. 84/423 R
7,279,630 B2 * 10/2007 Sasaki et al. .................. 84/723
7,453,037 B2 * 11/2008 Ishii et al. ...................... 84/600
2003/0070526 A1 * 4/2003 Muramatsu et al. ............ 84/21
2005/0145087 A1 * 7/2005 Fujiwara .......................... 84/1
2005/0145104 A1 * 7/2005 Sasaki ......................... 84/746
2005/0211079 A1 * 9/2005 Sasaki et al. .................. 84/723
2005/0235808 A1 * 10/2005 Ishii et al. ...................... 84/600
2006/0185497 A1 * 8/2006 Hirota et al. .............. 84/423 R
2007/0214944 A1 * 9/2007 Sasaki et al. .................. 84/615
2008/0017019 A1 * 1/2008 Hirota et al. .................. 84/744

FOREIGN PATENT DOCUMENTS

JP 2763530 B2 3/1988
JP 6-25895 U 4/1994
JP 2000-89758 A 3/2000

* cited by examiner

*Primary Examiner*—Marlon T Fletcher
(74) *Attorney, Agent, or Firm*—Birch, Stewart, Kolasch & Birch, LLP

(57) ABSTRACT

An electronic keyboard instrument having a keyboard provided with a plurality of keys, a first and a second switches provided corresponding to each key of the keyboard and being sequentially turned on at a time interval corresponding to a key depression speed of the keyboard, a counting unit for counting a count value corresponding to the time interval during which the first and the second switches are sequentially turned on, a correcting unit for correcting the count value or a value corresponding to the count value based on a variation of the time interval, and a velocity conversion unit for converting the corrected value into a velocity, is provided.

20 Claims, 19 Drawing Sheets

ELECTRONIC KEYBOARD INSTRUMENT AND PROCESSING METHOD OF THE SAME

CROSS-REFERENCE TO RELATED APPLICATIONS

This application is based upon and claims the benefit of priority from the prior Japanese Patent Application No. 2007-108442, filed on Apr. 17, 2007, the entire contents of which are incorporated herein by reference.

BACKGROUND OF THE INVENTION

1. Field of the Invention

The present invention relates to an electronic keyboard instrument and a processing method of the same.

2. Description of the Related Art

When obtaining volume data through a key operation, first, an electronic keyboard instrument counts a period of time during which a shutter passes through between two sensors, converts the count value into a value in which an auditory sense is taken into consideration using an exponential table, and further, makes the value go through a touch curve for controlling the volume, to thereby obtain a final volume data.

However, in reality, an apparent interval between the sensors varies due to an error of attaching touch detection sensors or the shutter, so that an obtainable range of the count value also varies.

The touch curve is used when assuming that the count value corresponding to from the maximum volume to the minimum volume (period of time during which the shutter passes through between the two sensors) is constant, so that when the obtainable range of the count value varies due to the error of attaching the touch detection sensors or the shutter, the count value gets out of an applicable range of the touch curve.

Under the present circumstances, even when the count value gets out of the applicable range of the touch curve, it is forced to be converted in spite of the problem, so that a variation in the amount of sound generation due to the attachment error cannot be absorbed. By the same reason, a variation due to an inconsistency in action and behavior also cannot be absorbed.

Further, Patent Document 1 described below discloses a touch response device storing, in a setting mode, a velocity conversion table for correcting, based on a stroke difference between a first contact and a second contact which detect an operating speed and an operating strength of the key operation, a detected velocity value of each key generated by the displacement of the stroke differences, and storing an indication information indicating the velocity conversion table.

Further, Patent Document 2 described below discloses a volume correction device for an electronic keyboard instrument correcting a touch curve that is previously formed by assuming a standard keyboard.

Further, Patent Document 3 described below discloses an electronic keyboard instrument including a keyboard having a plurality of keys, a switch provided corresponding to each key of the keyboard and having a plurality of contacts, a key touch detection circuit for obtaining key depression speed information based on a contact time difference between the contacts of the switch, a keyboard portion having a first memory that stores a variation of the time difference generated by a difference in distances between the contacts of the switch of the respective key as a variation data, a data transfer circuit for transferring the variation data stored in the first memory into a second memory, and a key touch correction circuit for correcting the key depression speed information obtained in the key touch detection circuit, based on the variation data in the second memory.

[Patent Document 1] Unexamined Utility Model Application No. Hei 6-25895

[Patent Document 2] Japanese Patent Application Laid-open No. 2000-89758

[Patent Document 3] Patent Publication No. 2763530

SUMMARY OF THE INVENTION

An object of the present invention is to provide an electronic keyboard instrument and a processing method of the same capable of accurately controlling a volume even when a variation in intervals between switches (sensors) exists.

According to the present invention, an electronic keyboard instrument has: a keyboard having a plurality of keys; a first and a second switches provided corresponding to each key of the keyboard and being sequentially turned on at a time interval corresponding to a key depression speed of the keyboard; a counting unit for counting a count value corresponding to the time interval during which the first and the second switches are sequentially turned on; a correcting unit for correcting the count value or a value corresponding to the count value based on a variation of the time interval; and a velocity conversion unit for converting the corrected value into a velocity.

Further, according to the present invention, a processing method of an electronic keyboard instrument having a keyboard provided with a plurality of keys, and a first and a second switches provided corresponding to each key of the keyboard and being sequentially turned on at a time interval corresponding to a key depression speed of the keyboard, has: a counting step for counting a count value corresponding to the time interval during which the first and the second switches are sequentially turned on; a correcting step for correcting the count value or a value corresponding to the count value based on a variation of the time interval; and a velocity conversion step for converting the corrected value into a velocity.

DETAILED DESCRIPTION OF THE PREFERRED EMBODIMENTS

Figure 1:
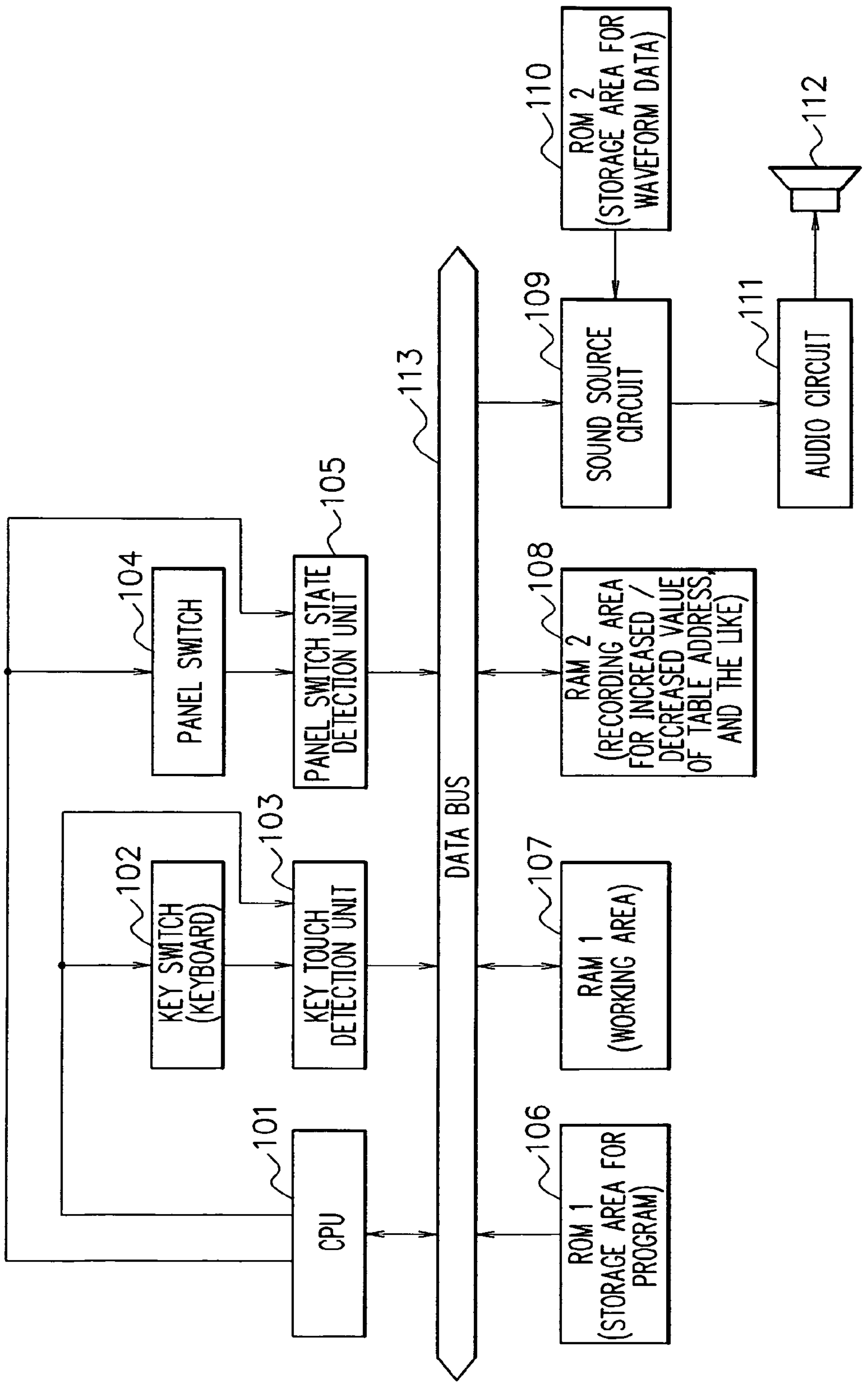
FIG. 1 is a block diagram showing a configuration example of an electronic keyboard instrument according to an embodiment of the present invention.

FIG. 1 is a block diagram showing a configuration example of an electronic keyboard instrument according to an embodiment of the present invention. "101" is a CPU for executing a program which performs a control of the whole electronic keyboard instrument. The program recognizes operating states of a keyboard 102 and a panel switch 104, and controls a sound source circuit 109.

"102" is a key switch and a keyboard for obtaining the operating state and an operating speed of the keyboard or of a member as typified by a hammer or a wippen that rotates in accordance with the movement of the keyboard. The keyboard 102 has a plurality of keys. The key switch 102 provides, for example, two switches to each key of the keyboard (or to the hammer corresponding to the key of the keyboard), detects a state of the key switch (on/off) corresponding to the key of the keyboard designated as a scan target, based on a key switch scan signal supplied from the CPU 101, and outputs the detection result to a later-described key touch detection unit 103.

"103" is a key touch detection unit for counting a time difference between which outputs of both two switches are turned on, based on the state of the key switch outputted from the key switch 102, and outputting the count value to the CPU 101. As a counting method, for example, it is configured such that a count value is initialized to a maximum value at a timing when a state of a switch S1 being provided at a near side among the two switches (FIG. 2) is changed from off to on, the count value is thereafter subtracted at regular time intervals, and a count value at a timing when a switch S2 being provided at a far side (FIG. 2) is changed from off to on is outputted from the key touch detection unit 103 to the CPU 101. By configuring as above, it is possible to recognize operating speed information corresponding to the time difference between the changes in the states of the two switches S1 and S2, namely, an operating speed of the keyboard, based on the largeness or smallness of the count value. The operating speed information is temporarily stored in a buffer on the key touch detection unit 103, and is read out by the CPU 101 via a data bus 113. The CPU 101 corrects the operating speed information and converts it into a velocity.

"104" is a plurality of panel switches used for setting/switching functions regarding the electronic keyboard instrument. A user of the electronic keyboard instrument operates the panel switch 104 to perform various setting operations as typified by a change of a tone and a selection of the touch curves, and to perform a setting of a volume correction value of each key used in the present embodiment. The panel switch 104 detects a state of a switch (on/off) designated as a scan target, based on a panel switch scan signal supplied from the CPU 101, and outputs the detection result to a later-described panel switch state detection unit 105.

"105" is a panel switch state detection unit for temporarily storing the detection result of the panel switch outputted from the panel switch 104, and outputting the detection result to the CPU 101 via the data bus 113.

"106" is a nonvolatile memory (first ROM, for instance) for storing the program operated on the CPU 101, a table used in the present embodiment, and the like.

"107" is a volatile memory (first RAM, for instance) used as a working area of the program operated on the CPU 101.

"108" is a nonvolatile memory (second RAM, for instance) for storing a correction value of a table address used in the present embodiment, and the like. Note that, for the nonvolatile memory 108, an element in which the CPU 101 can rewrite data, such as a flash memory and an EEPROM is selected, so that contents can be rewritten during the operation of the electronic keyboard instrument.

"109" is a sound source circuit generating an audio signal according to contents of a sound source control parameter (including velocity) set by the CPU 101 via the data bus 113. The sound source circuit 109 generates the audio signal by controlling the volume, based on the velocity.

Further, "110" is a nonvolatile memory (second ROM, for instance) for storing an audio signal waveform used by the sound source circuit 109. The audio signal generated in the sound source circuit 109 is outputted to a speaker 112 via a D/A converter and an amplifier on an audio circuit 111, and is sound generated to the outside of the electronic keyboard instrument.

A user of the electronic keyboard instrument executes a performance by operating the keyboard 102. At this time, the CPU 101 generates the sound source control parameter based on the operating state of the key switches obtained via the key switch 102 and the key touch detection unit 103 and the various settings obtained via the panel switch 104 and the panel switch state detection unit 105, and outputs the sound source control parameter to the sound source circuit 109, resulting that the sound is finally generated from the speaker 112.

Figure 2:
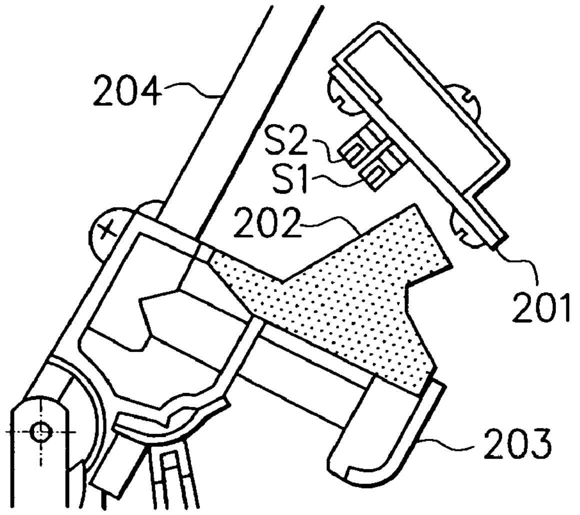
FIG. 2 is a view showing an arrangement example of key switches of each key.
Figure 3:
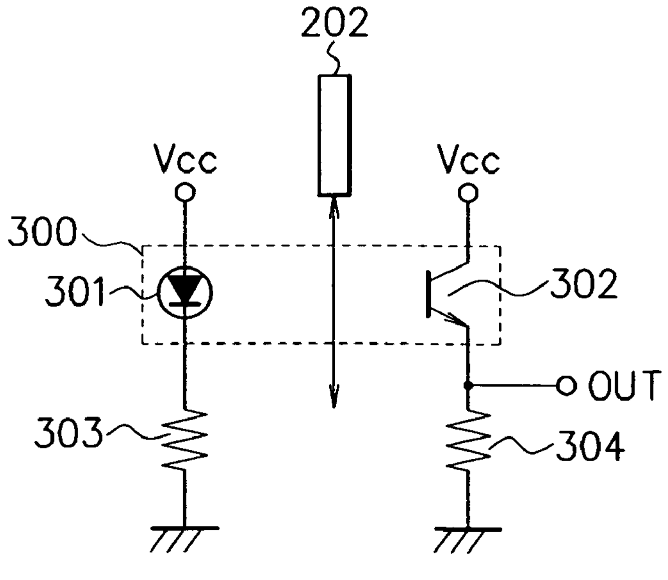
FIG. 3 is a circuit diagram showing a configuration example of the key switch.

FIG. 2 is a view showing an arrangement example of the key switch 102 of each key. The key switch 102 provides two key switches S1 and S2 to each key. "201" is a wiring substrate, "202" is a shutter, "203" is a catcher, and "204" is a hammer. For the key switches S1 and S2, elements formed of photointerrupters 300 (FIG. 3) detecting a transmission/interruption of light are used, for example. As shown in FIG. 3, the photointerrupter 300 is composed of a light-emitting diode 301 and a phototransistor 302 stored in the same case, and is formed in a C-shape.

In the example of FIG. 2, each two of the photointerrupters 300 are arranged on a rotational trajectory of the shutter 202 attached to each hammer 204 that rotates in accordance with the key of the keyboard, so that one shutter 202 crosses two photointerrupters 300. The shutter 202 is made of a rigid material such as a colored resin and a metal through which the light is not transmitted, and is formed in a plate shape. A color thereof is preferable to be dark, such as black. The shutter 202 is attached while striding over a butt in which a hammer shank and a catcher shank are inserted, and the catcher 203.

FIG. 3 is a circuit diagram showing a configuration example of the key switch S1. The key switch S2 also has the same configuration as of the key switch S1. The photointerrupter 300 includes the light-emitting diode 301 and the phototransistor 302. A serial connection circuit consisting of the light-emitting diode 301 and a resistance 303 and a serial connection circuit consisting of the phototransistor 302 and a resistance 304 are connected in parallel between a power supply voltage Vcc and a ground potential. When the shutter 202 crosses a space provided at a center portion of the C-shaped photointerrupter 300, an output voltage OUT varies.

Figure 4:
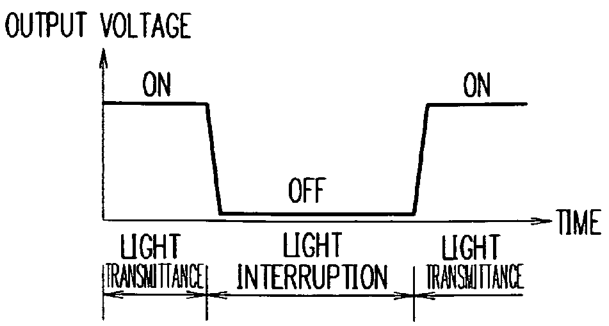
FIG. 4 is a time chart showing an operation example of the key switches.

FIG. 4 is a time chart showing an operation example of the key switches S1 and S2. When the shutter 202 does not exist between the light-emitting diode 301 and the phototransistor 302 in the photointerrupter 300, the light transmits, and the output voltage OUT indicates a value close to the power supply voltage Vcc. This state of the output voltage OUT is treated as a switch-on. On the contrary, when the shutter 202 exists between the light-emitting diode 301 and the phototransistor 302 in the photointerrupter 300, the light is interrupted, and the output voltage OUT indicates a value close to the ground potential. This state of the output voltage OUT is treated as a switch-off.

Figure 5:
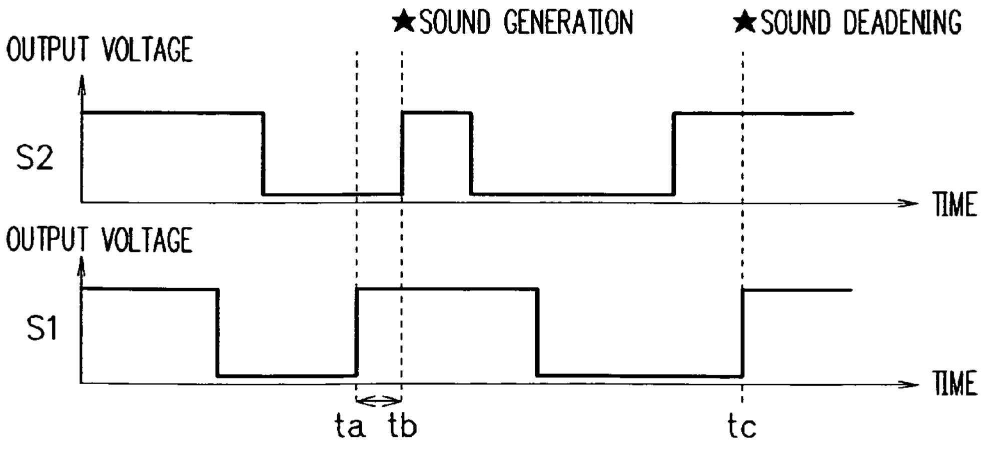
FIG. 5 is a time chart showing output examples of the key switches.

FIG. 5 is a time chart showing output examples of the key switches S1 and S2. When the key switches S1 and S2 are arranged as shown in FIG. 2, a positional relationship between the shutter 202 and the key switches (photointerrupters) S1 and S2 becomes as follows:

When the key is not depressed at all, the shutter 202 does not interrupt optical axes of both the two switches S1 and S2.

As the key of the keyboard is depressed, the hammer 204 rotates, and the shutter 202 interrupts the optical axes of the two key switches S1 and S2 in the order of S1 to S2.

As the key of the keyboard is further depressed, the shutter 202 passes the optical axes of the two key switches S1 and S2, and the key switches S1 and S2 become the light transmission state in the order of S1 to S2.

When the key of the keyboard is completely depressed, the shutter 202 does not interrupt the optical axes of both the two key switches S1 and S2.

When releasing the key of the keyboard, the positional relationship is changed in the opposite order.

The movement speed of the shutter 202 is detected during an interval between time ta and tb, and at the time tb, a sound is generated at a volume of velocity corresponding to the movement speed. Thereafter, a sound deadening process is conducted so that the sound generation is terminated when both the switches S1 and S2 are once turned off and then turned on as seen at a time tc. Note that, the interval between the time ta and tb is set to be an interval before which a member (jack) transmitting a force at the time of depressing the key to the hammer 204 is separated from the butt being an attachment base of the hammer 204, and it is set so that the shutter 202 moves at an equivalent speed during the interval between the time ta and tb.

Figure 6:
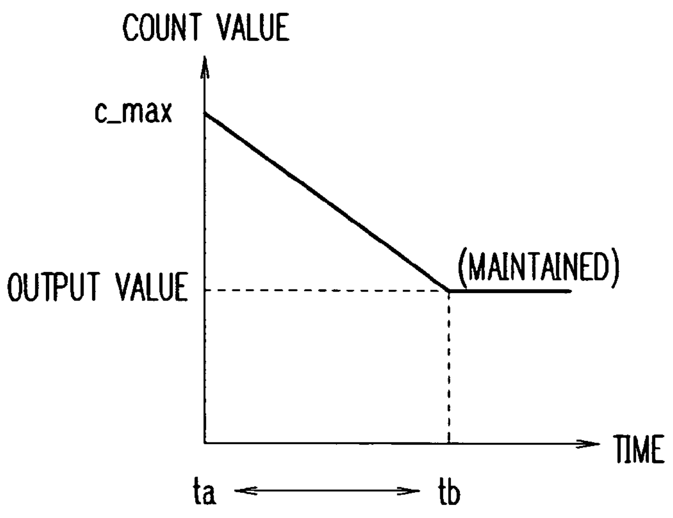
FIG. 6 is a view showing a variation example of a count value used for obtaining a movement speed of a hammer.

FIG. 6 is a view showing a variation example of a count value used for obtaining the movement speed of the hammer 204. The key touch detection unit 103 counts time from the time ta to tb in FIG. 5, and outputs a count value. A counter is reset to a maximum value c_max at a timing of the time ta in FIG. 5, it is thereafter subtracted at regular time intervals, and the value is determined at a timing of the time tb. The determined value is maintained until it is reset next time. Since the time interval during which the counter performs subtraction, and the distance between the switches S1 and S2 are previously determined, by examining how much the amount of maintained count value is subtracted from the maximum value, a speed at which the shutter 202 crosses from the switches S1 to S2, namely, the movement speed of the hammer 204 can be determined.

Since the electronic keyboard instrument recognizes the volume by each key, it has a region in which the counters of a number at least more than the number of the keys and the count values being the output of the counters are stored.

Figure 7:
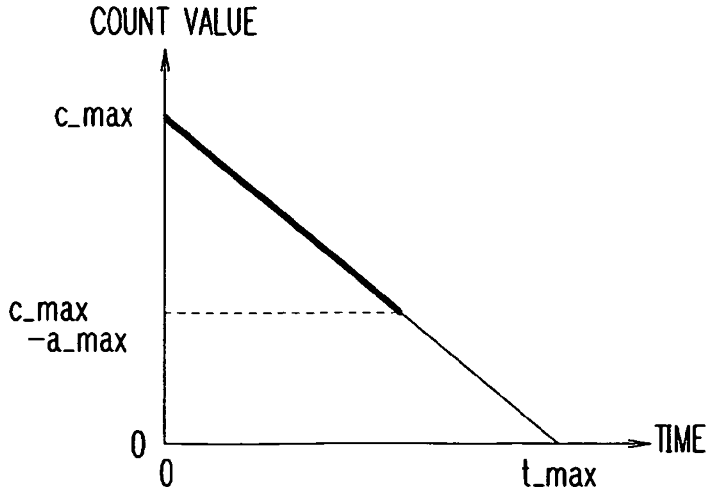
FIG. 7 is a view showing a variation range of the count value.

FIG. 7 is a view showing a variation range of the count value. As described before, the count value is initialized to the maximum value c_max at a timing of the time ta in FIG. 5. Thereafter, during the predetermined time t_max, the subtraction is performed at regular time intervals until the count value becomes 0 (zero).

Figure 9:
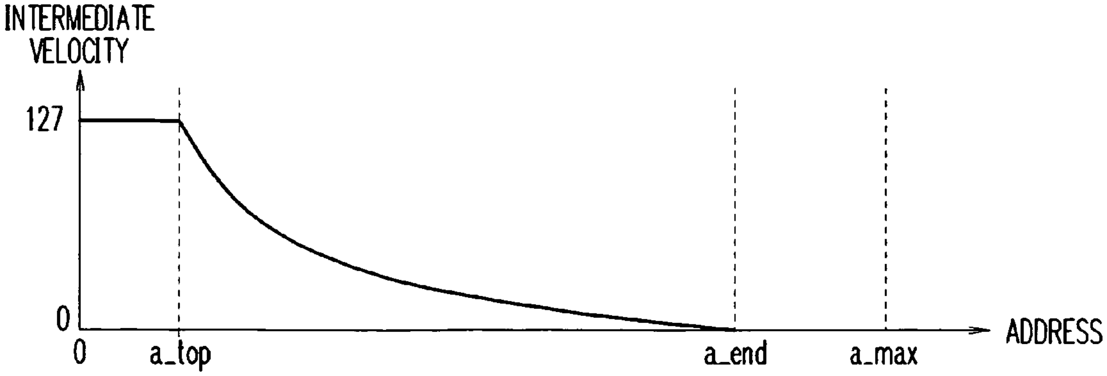
FIG. 9 is a view showing an example of the linear-to-log conversion table.

As will be described later, the count value is used as an address when referring a linear-to-log conversion table (FIG. 9). Therefore, the maximum value c_max of the count value is set to become larger than a size a_max of the linear-to-log conversion table. Further, a relationship between the interval between the key switches S1 and S2 as well as the time interval for subtracting the count value and the size a_max of the linear-to-log conversion table is set, in which the count value obtained by a performance operation falls in a range of a thick-line portion in FIG. 7 (count value: (c_max−a_max) to c_max), so that the obtained address does not exceed the range of the linear-to-log conversion table.

Figure 8:
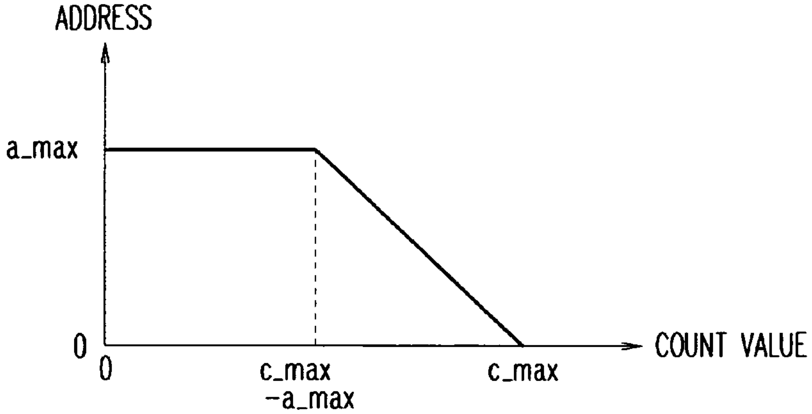
FIG. 8 is a view showing an example of converting the count value into an address for a linear-to-log conversion table.

FIG. 8 is a view showing an example of converting the count value into the address for the linear-to-log conversion table. When the count value is from 0 (zero) to (c_max−a_max), the address is set constant at the maximum value a_max, and when the count value is from (c_max−a_max) to (c_max), the address is monotonously decreased within a range of 0 (zero) or larger. This conversion can be conducted by using a form of conversion table shown in FIG. 8, or by a calculation. When the address is determined by the calculation, a value of a_max or larger is replaced by a_max, in which a range of the value is limited.

When the movement speed of the shutter 202 is fast, the subtraction of the count value is not performed very often, so that the obtained count value is large. When the conversion as shown in FIG. 8 is conducted, a small address is obtained, and an intermediate velocity being an output of the linear-to-log conversion table in FIG. 9 takes a large value. On the contrary, when the movement speed of the shutter 202 is slow, the subtraction of the count value is performed often, so that the obtained count value becomes small, resulting that the intermediate velocity takes a small value.

FIG. 9 is a view showing an example of the linear-to-log conversion table. The linear-to-log conversion table is a table for converting the address in FIG. 8 into an intermediate address. Further, the linear-to-log conversion table converts the count value outputted linearly with respect to a time base into a log value in accordance with a human auditory sense. The count value is converted into the address by the method described in FIG. 8, and the linear-to-log conversion table in FIG. 9 is referred. It is better to set the output of the linear-to-log conversion table (intermediate velocity) within a range of values that a MIDI velocity takes (0 (zero) to 127).

An address value a_top is a value obtained from the count value at the time when the shutter 202 crosses from the switches S1 to S2 at a minimum time, and is a changing point at which the output of the linear-to-log conversion table becomes 127 or smaller. The address value a_top is set to an address value or set little smaller than the address value that is obtained when depressing a key to be a standard key, for example, a key having a key number of 40, with a maximum force. An address value a_end is an address value in which the intermediate velocity becomes 0 (zero).

Figure 10:
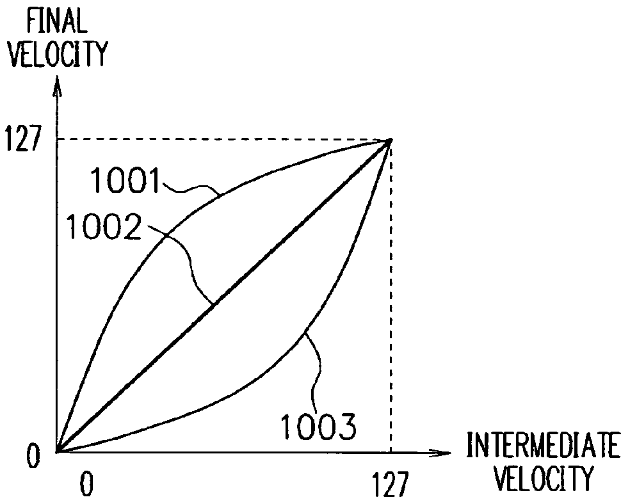
FIG. 10 is a view showing an example of touch curves.

FIG. 10 is a view showing an example of the touch curves. A horizontal axis indicates the intermediate velocity, and a vertical axis indicates a final velocity. The touch curve is a conversion table used for adjusting a volume characteristic of the electronic keyboard instrument, and is used for adjusting so that the intermediate velocity obtained by converting the count value using the linear-to-log conversion table in FIG. 9 can be used as a volume of sound generation of the electronic keyboard instrument.

When a touch curve 1001 is applied, the intermediate velocity is changed to a value that is larger than before, so that the amount of sound generation of the electronic keyboard instrument also becomes large. In such a case, since it becomes possible to easily generate sound with large volume in the electronic keyboard instrument, a performer feels that a touch response of the keyboard becomes light. On the other hand, when a touch curve 1003 is applied, the intermediate velocity is changed to a value that is smaller than before, so that the amount of sound generation of the electronic keyboard instrument also becomes small. In such a case, since a large key-depressing force is needed to generate a large volume in the electronic keyboard instrument, the performer feels that the touch response of the keyboard becomes heavy. A touch curve 1002 is designed in which the intermediate velocity and the final velocity become the same.

Figure 11:
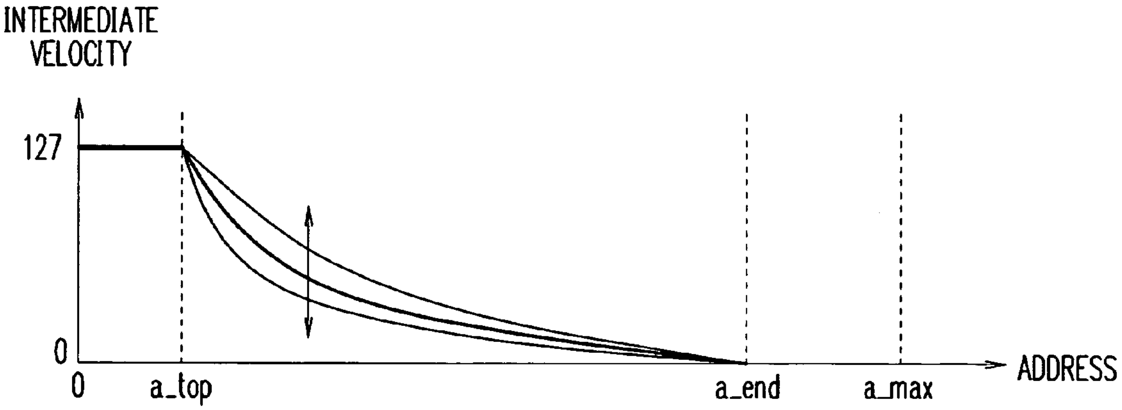
FIG. 11 is a view showing an image of results of a volume adjustment achieved by the three touch curves.

FIG. 11 is a view showing an image of results of the volume adjustment achieved by the three touch curves 1001 to 1003. A horizontal axis indicates the address and a vertical axis indicates the intermediate velocity. Although a process for changing the degree of lightness/heaviness of the touch is actually conducted by increasing or decreasing the intermediate velocity using the touch curves 1001 to 1003, when the adjustment is performed on the linear-to-log conversion table, it is equivalent to changing the linear-to-log table into the state as shown in FIG. 11.

FIGS. 12A and 12B, and FIGS. 13A to 13D show examples of attachment states of members in the periphery of the key switches S1 and S2. When there are errors in the attachment positions and angles of the key switches (photointerrupters) S1 and S2 or of the shutter 202 at the time of attachment, the time during which the shutter 202 crosses from the key switches S1 to S2 changes due to the reasons described below.

Figure 12A:
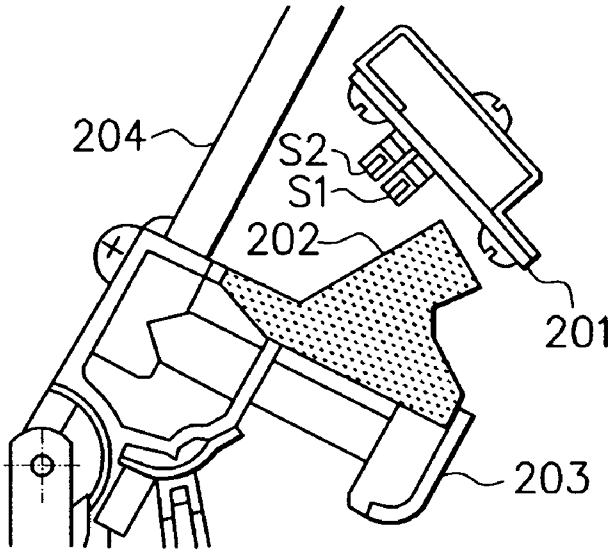
FIGS. 12A and 12B are views showing examples of obtaining the movement speed of the hammer as a velocity, by detecting the movement of the hammer using the key switches.
Figure 12B:
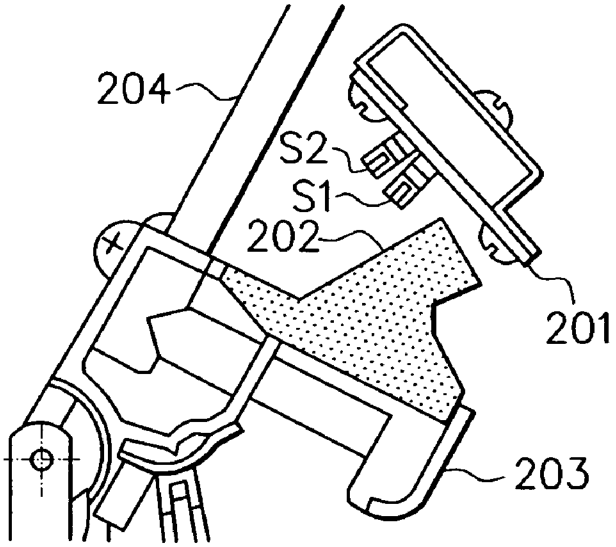

FIGS. 12A and 12B are views showing examples of obtaining the movement speed of the hammer as a velocity, by detecting the movement of the hammer 204 using the key switches S1 and S2. "201" is the wiring substrate, "202" is the shutter, "203" is the catcher, and "204" is the hammer. FIG. 12A is a view showing a normal attachment state of the key switches S1 and S2, and FIG. 12B is a view showing an abnormal attachment state of the key switches Si and S2.

When a method of attaching the key switches S1 and S2 provided on the wiring substrate 201 is inappropriate, the key switch S1 and/or the key switch S2 incline(s) and (a) position (s) thereof is (are) displaced as shown in FIG. 12B, resulting that the distance between the key switches S1 and S2 increases or decreases. Accordingly, the time taken for the shutter 202 to cross from the key switches S1 to S2 also increases or decreases.

Figure 13A:
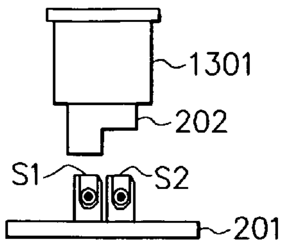
FIGS. 13A to 13D are views showing examples of obtaining a movement speed of the key as a velocity, by detecting the movement of the key of the keyboard using the key switches.
Figure 13B:
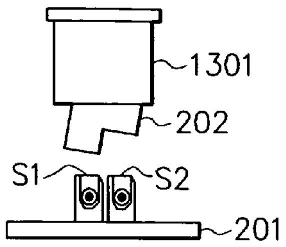
Figure 13C:
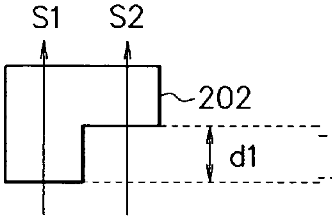
Figure 13D:
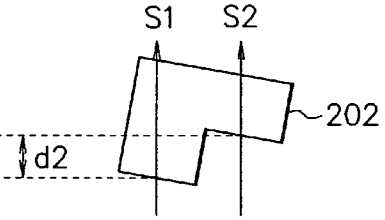

FIGS. 13A to 13D are views showing examples of obtaining the movement speed of the key as a velocity, by detecting the movement of the key of the keyboard using the key switches S1 and S2. "201" is the wiring substrate, "202" is the shutter, and "1301" is a key of the keyboard. FIG. 13A is a view showing a normal attachment state of the shutter 202, and FIG. 13C is a view showing a level difference d1 of the shutter 202 in the state of FIG. 13A. FIG. 13B is a view showing an abnormal attachment state of the shutter 202, and FIG. 13D is a view showing a level difference d2 of the shutter 202 in the state of FIG. 13B.

When a method of attaching the shutter 202 provided under each key 1301 of the keyboard is inappropriate, the shutter 202 inclines and a position thereof is displaced as shown in FIG. 13B, resulting that a distance d2 between the key switches S1 and S2 in FIG. 13D increases or decreases. Accordingly, the time taken for the shutter 202 to cross from the key switches S1 to S2 also increases or decreases.

Figure 14:
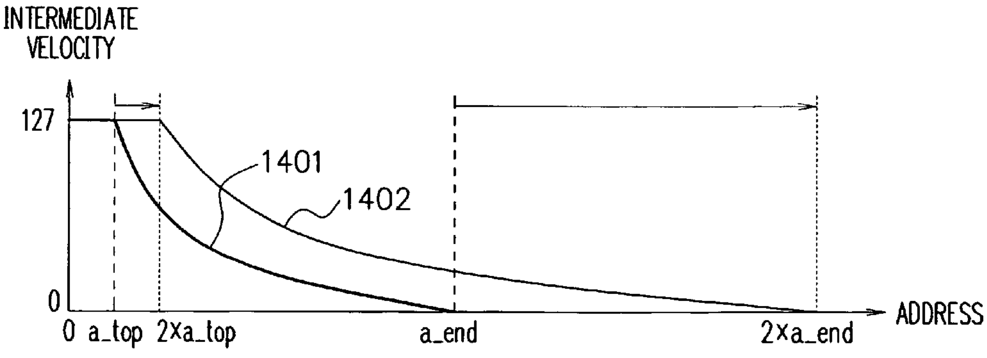
FIG. 14 is a view showing an example of a linear-to-log conversion table in which an extension of a distance between the key switches is taken into consideration.

FIG. 14 is a view showing an example of a linear-to-log conversion table in which an extension of a distance between the key switches S1 and S2 is taken into consideration. A horizontal axis indicates the address and a vertical axis indicates the intermediate velocity. As an extreme example, when assuming that the interval between the key switches S1 and S2 is doubly extended, since the shutter 202 moves at the equivalent speed during the speed detection interval as described before, the time for moving between the key switches S1 and S2 becomes double, and the obtainable range of the output of the key touch detection unit 103 (count value) is also doubly increased. When the variation range of the count value is doubled, so is the obtainable range of the address value obtained by converting the count value, so that when the interval between the key switches S1 and S2 to which a linear-to-log conversion table 1401 in FIG. 14 is applied is doubled, for example, it is preferable to deal with this by doubly extending the address, as shown in a linear-to-log conversion table 1402. On the contrary, when the interval between the key switches S1 and S2 is shortened to half, the count value is also decreased to half. Accordingly, it is preferable to cope with this by contracting the conversion table to half the conversion table 1401, although it is not illustrated.

Figure 15:
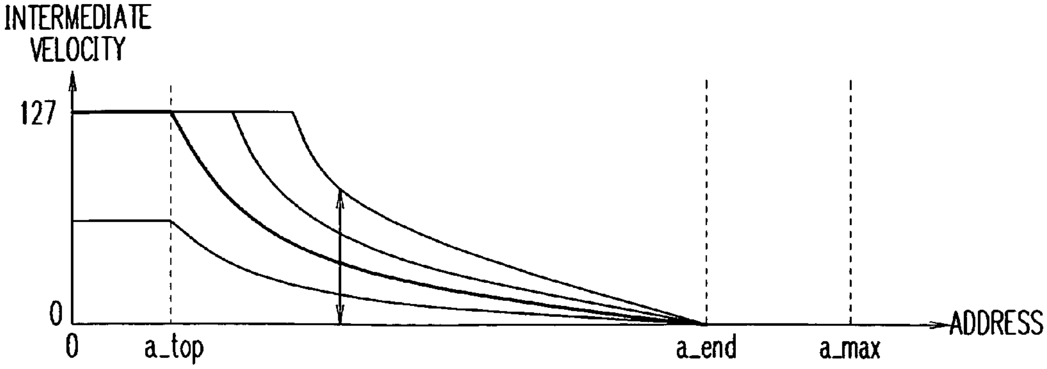
FIG. 15 is a view showing an image of a volume correction according to a comparative example.

FIG. 15 is a view showing an image of a volume correction according to a comparative example. A horizontal axis indicates the address and a vertical axis indicates the intermediate velocity. Although the volume correction of each key is actually conducted on the touch curve in FIG. 10, to simplify the explanation, an image in which the same effect is obtained by changing the characteristic of the linear-to-log conversion table is shown in FIG. 15.

In the comparative example, a correction value α in a range of −1.0 to +1.0 is set by each keyboard, and by using a final velocity velo obtained through the touch curve in FIG. 10, a calculation of velo+velo×α is conducted, to thereby correct the final velocity velo to a value in a range of (0 (zero)×velo) to (2×velo). The final velocity correction value is set to 0 (zero) when the calculation result is smaller than 0 (zero), and is set to 127 when the calculation result is 127 or larger, to thereby limit the output to fall in a range of 0 (zero) to 127.

However, due to the reasons described in FIGS. 13A to 13D, the correction method cannot reflect the present situation. Further, when the correction value α is corrected to be a value smaller than 0 (zero), the maximum value of the velocity becomes inevitably smaller than 127, which is a problem.

Figure 16:
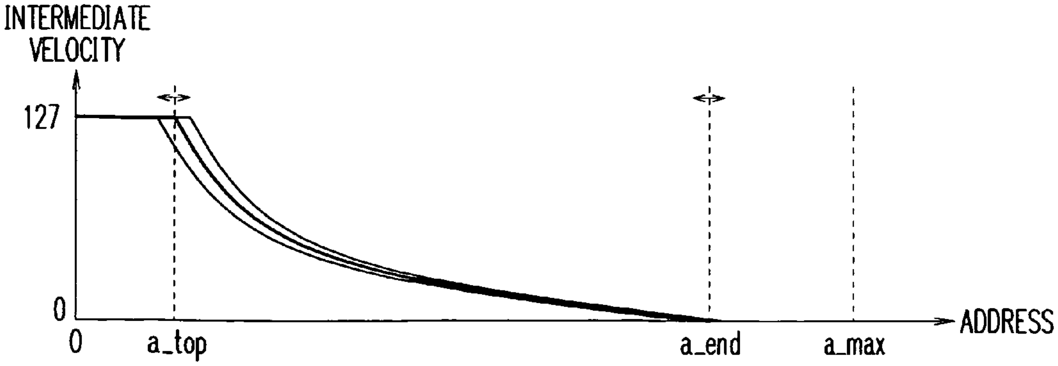
FIG. 16 is a view showing an image of a volume correction using a parallel shift process according to the present embodiment.

FIG. 16 is a view showing an image of the volume correction using a parallel shift process according to the present embodiment. A horizontal axis indicates the address and a vertical axis indicates the intermediate velocity. Although the volume correction of each key is actually conducted by correcting the address for referring the linear-to-log conversion table so that the address falls in an effective range of the linear-to-log conversion table to be a standard, shown by a thick line in the middle of FIG. 16, to simplify the explanation, an image in which the same effect is obtained by changing the characteristic of the linear-to-log conversion table is shown.

The correction method is equivalent to parallel shifting each apparent linear-to-log conversion table that is provided with each key. When the address value of the linear-to-log conversion table is in a range of small values, a variation width of the velocity is large, and an effect on the velocity due to the increase or decrease of the number of counts is also large, but, when the address value is in a range of large values, the variation width of the velocity is small, and since the velocity values themselves are small, a difference between them is difficult to detect. The correction method is a method paying attention to the above-described characteristics.

The correction is conducted by a method in which a correction value β that is provided with each key is directly added or subtracted to or from the address of the linear-to-log conversion table obtained by converting the count value as shown in FIG. 8. For an obtainable range of the correction value β, a range that falls within a data of about 1 byte (−64 to +63) is wide enough, although depending on the interval between the key switches S1 and S2 and the calculation speed of the counter. If the correction value β is positive, the address becomes small by the subtraction, so that a value of the intermediate velocity being the output of the linear-to-log conversion table becomes large. On the contrary, if the correction value β is negative, the address becomes large by the subtraction, so that a value of the intermediate velocity being the output of the linear-to-log conversion table becomes small.

Strictly speaking, this correction method cannot deal with the phenomena described in FIG. 14, but, it is applicable when a variation of the count values due to an error of setting the interval between the key switches is relatively small.

Figure 17:
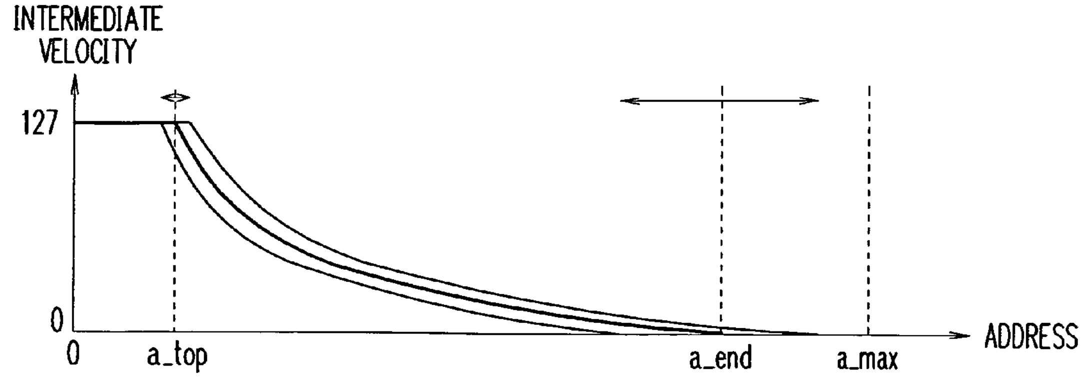
FIG. 17 is a view showing an image of a volume correction using an expansion/contraction process according to the present embodiment.

FIG. 17 is a view showing an image of the volume correction using an expansion/contraction process according to the present embodiment. A horizontal axis indicates the address and a vertical axis indicates the intermediate velocity. As same as in FIG. 16, although the volume correction of each key is actually conducted by correcting the address for referring the linear-to-log conversion table so that the address falls in an effective range of the linear-to-log conversion table to be a standard, shown by a thick line in the middle of FIG. 17, to simplify the explanation, an image in which the same effect is obtained by changing the characteristic of the linear-to-log conversion table is shown.

The correction method is equivalent to expanding/contracting each apparent linear-to-log conversion table that is provided with each key.

The correction method conducts a correction by multiplying the address of the linear-to-log conversion table by an expansion/contraction magnification in which the correction value β that is provided with each key is taken into account, and since a multiplication unit is needed, a cost is accordingly increased compared to the method using the parallel shift, but, it is possible to deal with the phenomena described in FIG. 14 relatively properly.

Figure 18:
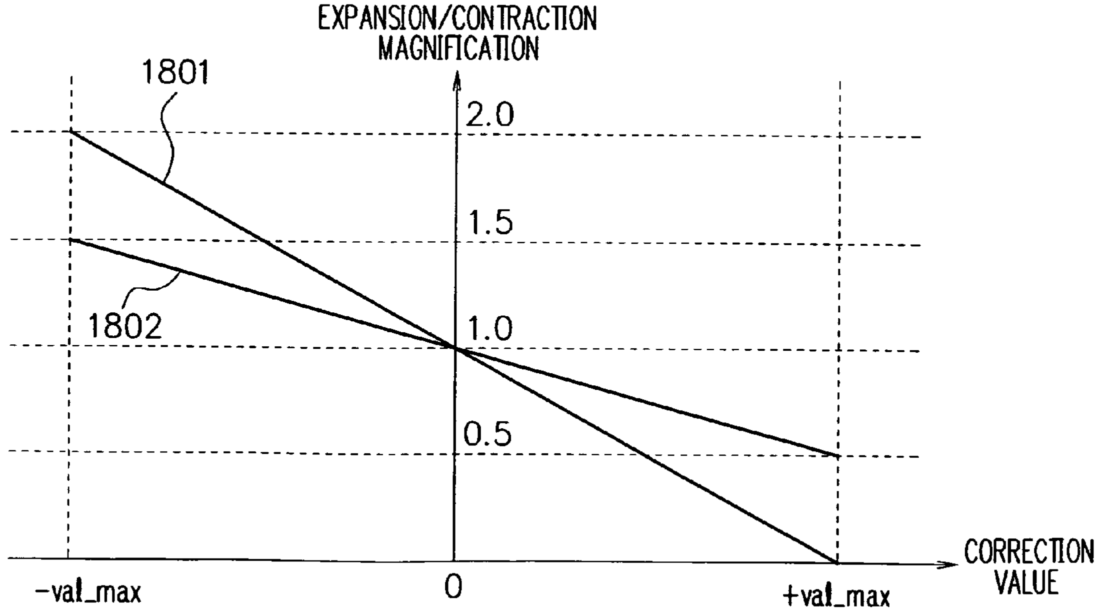
FIG. 18 is a view showing an example of an expansion/contraction magnification used in the expansion/contraction process according to the present embodiment.

FIG. 18 is a view showing an example of the expansion/contraction magnification used in the expansion/contraction process according to the present embodiment. The expansion/contraction magnification to the address of the linear-to-log conversion table is determined from the correction value β (−val_max to +val_max). When a conversion shown by a straight line 1801 in FIG. 18 is conducted, the expansion/contraction magnification of 0 (zero) to 2.0 can be obtained, and when a conversion shown by a straight line 1802 is conducted, the expansion/contraction magnification of 0.5 to 1.5 can be obtained. The expansion/contraction magnification is limited to be in a range of positive values. Although two kinds of the expansion/contraction magnifications are shown in the drawing, actually, it is allowable that only one kind of the expansion/contraction magnification is set based on a variation condition of the key switches S1 and S2. If the correction value is positive, the expansion/contraction magnification becomes smaller than 1, so that the address becomes small by the multiplication and a value of the intermediate velocity being the output of the linear-to-log conversion table becomes large. On the contrary, if the correction value is negative, the expansion/contraction magnification becomes 1 or larger, so that the address becomes large by the multiplication and a value of the intermediate velocity being the output of the linear-to-log conversion table becomes small.

Figure 19:
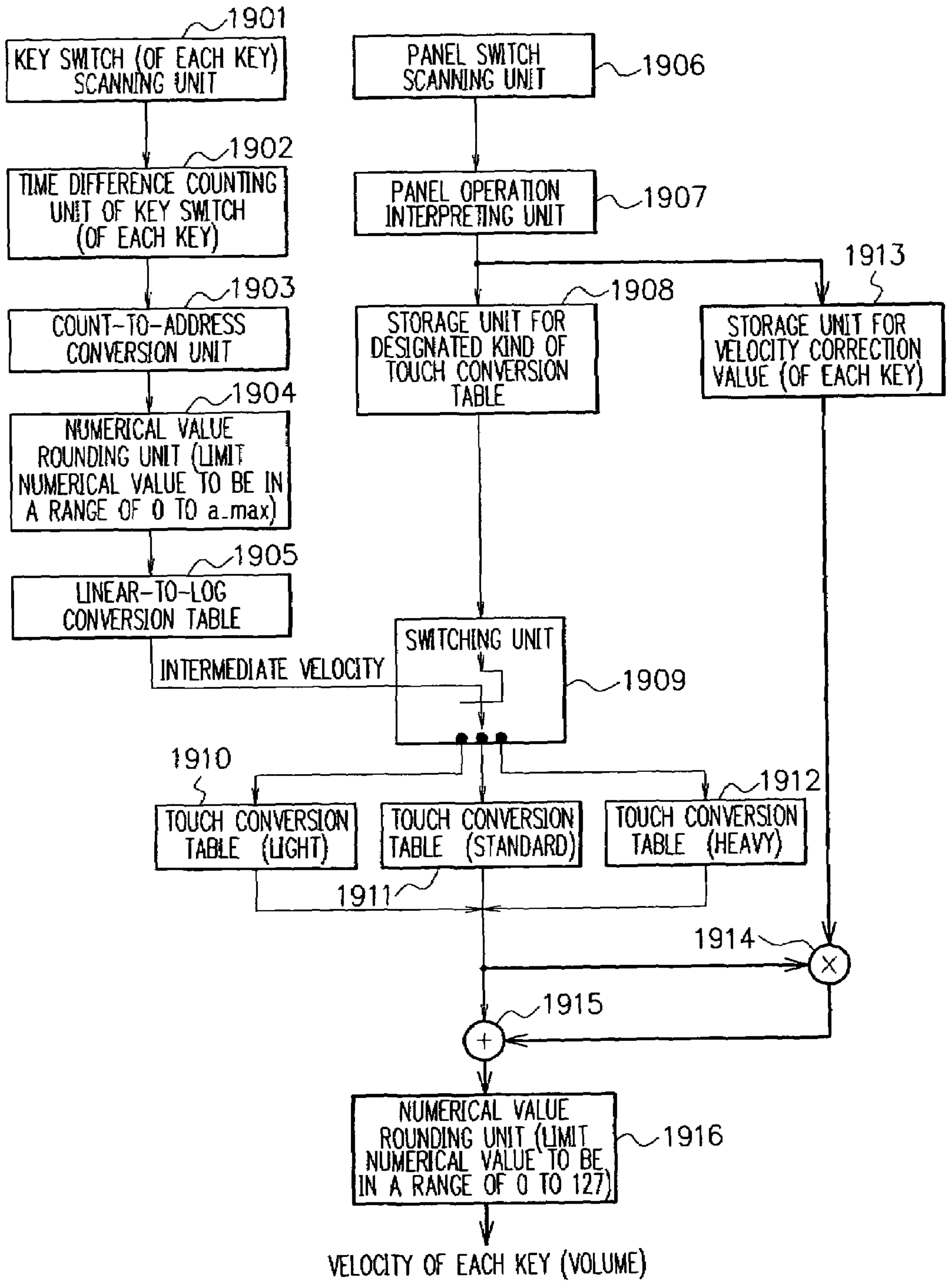
FIG. 19 is a view showing an image of a data flow until a velocity is obtained, in the comparative example in FIG. 15.

FIG. 19 is a view showing an image of a data flow until a velocity is obtained, in the comparative example in FIG. 15. As described before, in this method, the volume correction of each key is conducted after the velocity conversion by the touch curve is performed.

A key switch scanning unit 1901 of each key scans the states of the key switches S1 and S2. Next, a time difference counting unit 1902 of key switches of each key counts the time between ta and tb, which is from the time when the key switch S1 is turned on, to the time when the key switch S2 is turned on. Next, a count-to-address conversion unit 1903 converts the count value into the address, as shown in FIG. 8. Next, a numerical value rounding unit 1904 limits the address to fall within a range of 0 (zero) to a_max. Next, as shown in FIG. 9, a linear-to-log conversion table 1905 converts the address value into the intermediate velocity, and outputs it.

A panel switch scanning unit 1906 scans the state of the panel switch 104. Next, a panel operation interpreting unit 1907 interprets the panel operation according to the state of the panel switch 104. By operating the panel switch 104, a user can select one among three touch conversion tables 1910 to 1912, and designate a velocity correction value. A storage unit 1908 for the designated kind of the touch conversion table controls a switching unit 1909 according to the output of the panel operation interpreting unit 1907. The switching unit 1909 switches the three touch conversion tables 1910 to 1912, to output the intermediate velocity outputted from the linear-to-log conversion table 1905 into one of them.

The touch conversion table 1910 corresponds to the touch conversion table 1001 for a light touch (FIG. 10), and converts the intermediate velocity into the final velocity. The touch conversion table 1911 corresponds to the touch conversion table 1002 for a standard touch (FIG. 10), and converts the intermediate velocity into the final velocity. The touch conversion table 1912 corresponds to the touch conversion table 1003 for a heavy touch (FIG. 10), and converts the intermediate velocity into the final velocity.

A storage unit 1913 for a velocity correction value of each key outputs the velocity correction value of each key (−1.0 to +1.0) according to the output of the panel operation interpreting unit 1907. A multiplier 1914 multiplies the final velocity outputted from one of the touch conversion tables 1910 to 1912 selected by the switching unit 1909 and the velocity correction value outputted from the storage unit 1913, and outputs the calculated value. An adder 1915 adds the final velocity outputted from one of the touch conversion tables 1910 to 1912 selected by the switching unit 1909 and the output value from the multiplier 1914, to thereby output a final velocity correction value. Next, a numerical value rounding unit 1916 limits the output value from the adder 1915 to fall within a range of 0 (zero) to 127, and outputs a velocity (volume) of each key.

Figure 20:
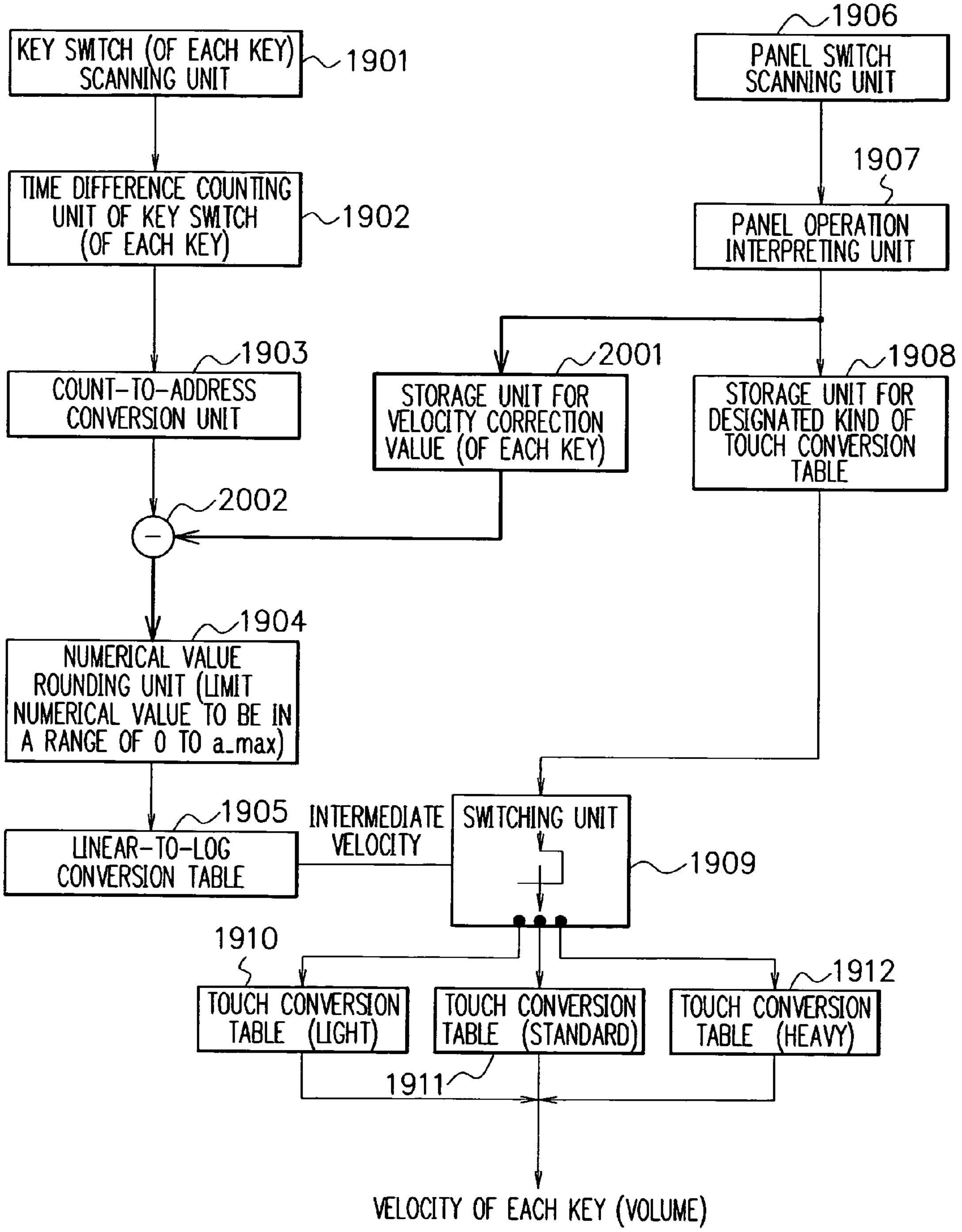
FIG. 20 is a view showing an image of a data flow until a velocity is obtained, in the parallel shift process according to the present embodiment described in FIG. 16.

FIG. 20 is a view showing an image of a data flow until a velocity is obtained, in the parallel shift process according to the present embodiment described in FIG. 16. As described before, in the method, to obtain a volume correction result that is closer to reality than that obtained in the comparative example in FIG. 19, the volume correction of each key is conducted at the time when referring the linear-to-log conversion table, and thereafter, the velocity conversion by the touch curve is performed.

FIG. 20 is a view in which the storage unit 1913, the multiplier 1914 and the adder 1915 are deleted and a storage unit 2001 and a subtracter 2002 are added from/to FIG. 19. Hereinafter, the point where FIG. 20 differs from FIG. 19 will be explained. The storage unit 2001 stores a velocity correction value β of each key, and outputs it according to the output of the panel operation interpreting unit 1907. The subtracter 2002 subtracts the velocity correction value β outputted from the storage unit 2001, from the address outputted from the count-to-address conversion unit 1903, and outputs the calculated value to the numerical value rounding unit 1904. A final velocity outputted from one of the touch conversion tables 1910 to 1912 selected by the switching unit 1909 becomes a final velocity (volume) of each key.

Figure 21:
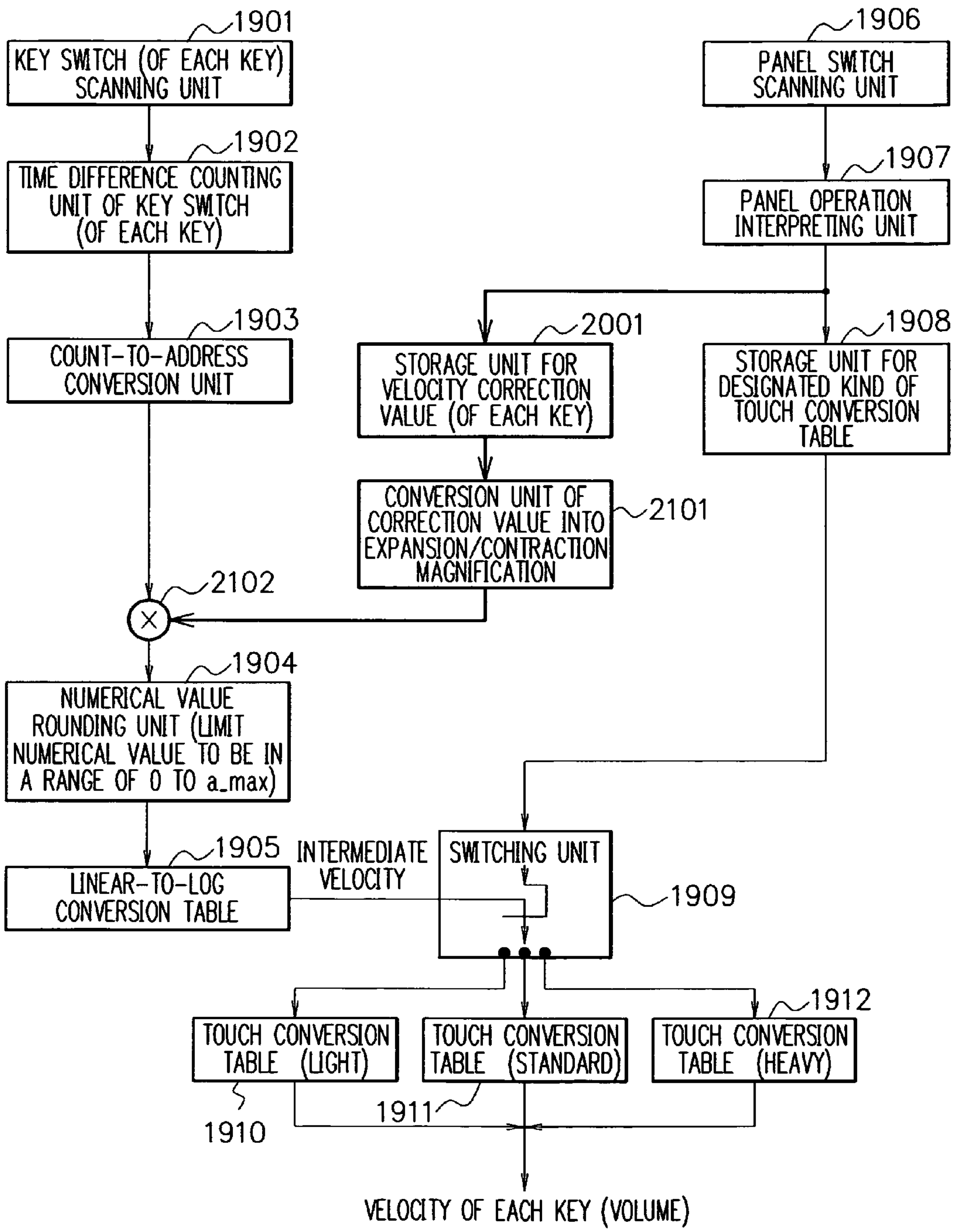
FIG. 21 is a view showing an image of a data flow until a velocity is obtained, in the expansion/contraction process according to the present embodiment described in FIG. 17.

FIG. 21 is a view showing an image of a data flow until a velocity is obtained, in the expansion/contraction process according to the present embodiment described in FIG. 17. Also in this method, by the same reason as in the parallel shift process of the present embodiment (FIG. 20), the volume correction of each key is conducted at the time when referring the linear-to-log conversion table, and thereafter, the velocity conversion by the touch curve is performed.

FIG. 21 is a view in which the subtracter 2002 is deleted and a conversion unit 2101 and a multiplier 2102 are added from/to FIG. 20. Hereinafter, the point where FIG. 21 differs from FIG. 20 will be explained. As shown in FIG. 18, the conversion unit 2101 converts the correction value β outputted from the storage unit 2001 into the expansion/contraction magnification (0.5 to 1.5, for example), and outputs it. The multiplier 2102 multiplies the address outputted from the count-to-address conversion unit 1903 by the expansion/contraction magnification outputted from the conversion unit 2101, and outputs the calculated value to the numerical value rounding unit 1904. A final velocity outputted from one of the touch conversion tables 1910 to 1912 selected by the switching unit 1909 becomes a final velocity (volume) of each key.

Figure 22:
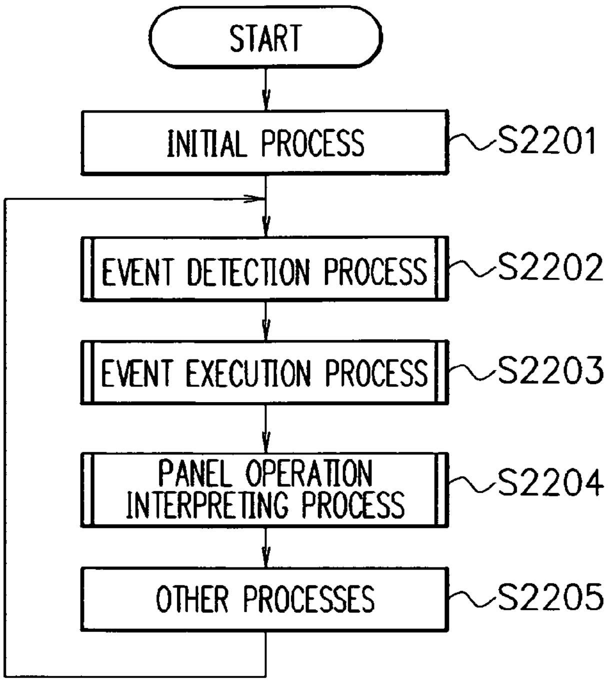
FIG. 22 is a flow chart showing a main routine of a processing method of the electronic keyboard instrument in FIG. 1.

FIG. 22 is a flow chart showing a main routine of a processing method of the electronic keyboard instrument in FIG. 1. The process of the electronic keyboard instrument is conducted by the CPU 101 when it executes a program in a memory 106.

In a step S2201, the CPU 101 initializes various kinds of parameters by an initial process. Next, in a step S2202, an event detection process regarding the sound generation/sound deadening is conducted. Next, in a step S2203, an event execution process is conducted. Next, in a step S2204, a panel operation interpreting process (including panel switch detection process) is conducted. Next, in a step S2205, other processes are conducted. Thereafter, the process goes back to the step S2202, and it is continued until a power supply of the electronic keyboard instrument is turned off. For the other processes, although detailed explanations are omitted, a control of transmission/reception of MIDI, a control of reproduction of demo music, a recording of contents of a performance, and the like, are conducted.

Figure 23:
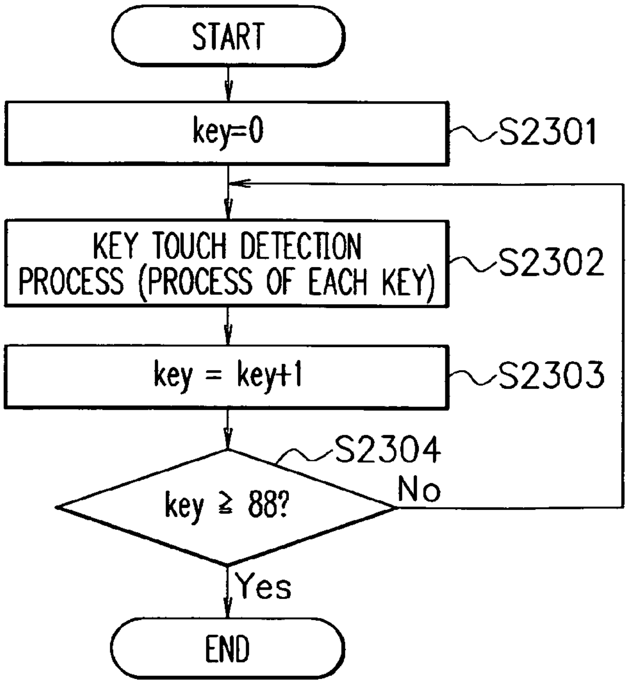
FIG. 23 is a flow chart showing details of an event detection process of a step S2202 in FIG. 22.

FIG. 23 is a flow chart showing details of the event detection process of the step S2202 in FIG. 22. First, in a step S2301, the CPU 101 sets a key variable “key” to 0 (zero). Next, in a step S2302, the CPU 101 conducts a key touch detection process of each key via the key touch detection unit 103. Specifically, the CPU 101 detects the states of the key switches S1 and S2. Next, in a step S2303, the CPU 101 increments the key variable “key”. Next, in a step S2304, the CPU 101 checks whether or not the key variable “key” is 88 or larger. When the key variable “key” is not 88 or larger, the process goes back to the step S2302, and when it is 88 or larger, the process is terminated.

Here, although it is explained that the process for detecting the events regarding the sound generation in compliance with the performance operation is conducted by performing the touch detection process for 88 keys at every time the main routine goes around one time, it may be conducted by configuring such that the process for 88 keys is divided to be performed during the main routine goes around several times.

Figure 24:
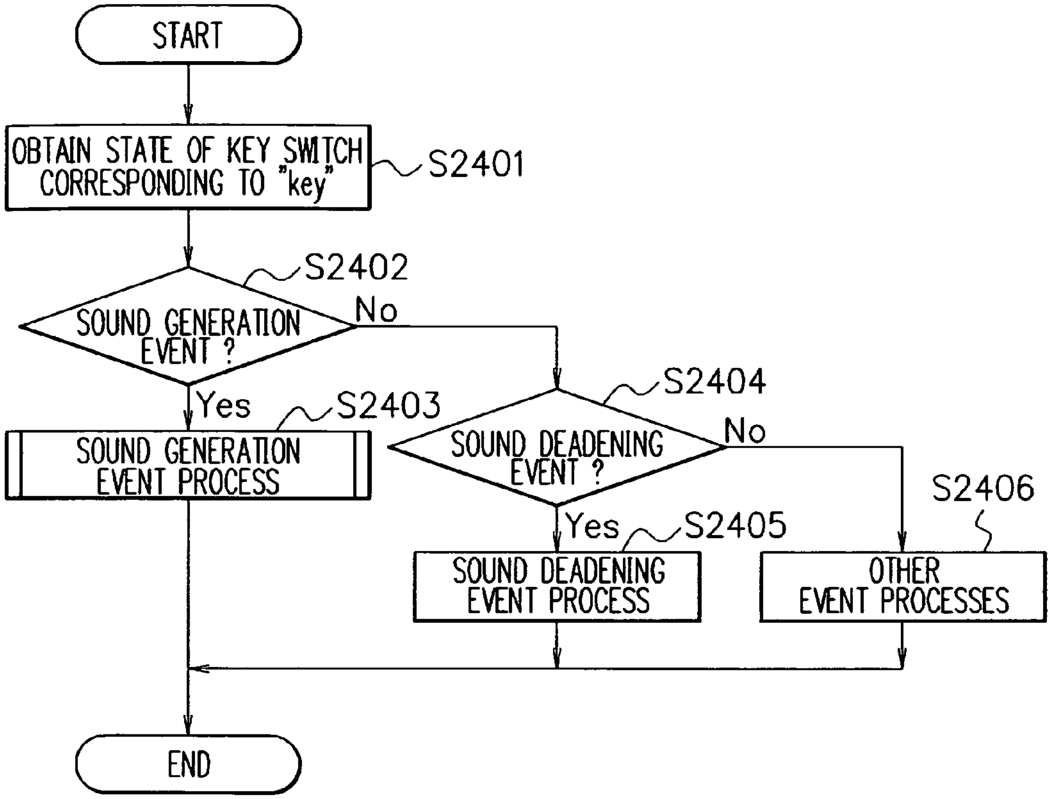
FIG. 24 is a flow chart showing details of an event execution process of a step S2203 in FIG. 22.

FIG. 24 is a flow chart showing details of the event execution process of the step S2203 in FIG. 22. First, in a step S2401, the CPU 101 obtains the states of the key switches S1 and S2 corresponding to the key variable “key” via the key touch detection unit 103. Next, in a step S2402, the CPU 101 checks whether a sound generation event is generated or not. When the sound generation event is generated, the process goes to a step S2403, and when it is not generated, the process goes to a step S2404. In the step S2403, the CPU 101 conducts a sound generation event process to the sound source circuit 109, and terminates the process. In the step S2404, the CPU 101 checks whether a sound deadening event is generated or not. When the sound deadening event is generated, the process goes to a step S2405, and when it is not generated, the process goes to a step S2406. In the step S2405, the CPU 101 conducts a sound deadening event process to the sound source circuit 109, and terminates the process. In the step S2406, the CPU 101 conducts other event processes, and terminates the process.

Here, as same as in FIG. 23, regarding the designated key variable “key”, the sound generation and the sound deadening of electronic sound are conducted by referring the states of the key switches S1 and S2 explained in FIG. 5 and the count value explained in FIG. 6. Since judging contents regarding the sound generation event and the sound deadening event are not described in FIG. 24, further detailed processing contents will be explained hereinafter.

At a normal timing of the sound generation, the subtraction process is conducted according to the distance between the key switches S1 and S2, so that a count value count [key] being definitely smaller than the maximum value can be obtained. On the contrary, at a timing of other than the sound generation, the calculation result is retained immediately after the reset of the counter, resulting that the maximum count value (=c_max) being the reset value can be obtained. Therefore, if the count value count [key] is checked whether it is the maximum value or not, after both the key switches S1 and S2 are recognized to be turned on, it is possible to judge which of the sound generation process and the sound deadening process should be conducted.

It is prepared such that when a sound generation instruction is recorded, the count value is also recorded simultaneously, so that the movement speed of the hammer 204, namely, a strength of the sound generation can be calculated thereafter. If a sound deadening instruction is recorded in the same manner as in the sound generation instruction, a process thereafter can be simplified. Although the count value when the sound deadening event is generated is the maximum value, it is allowable to replace the count value by 0 (zero) and record it as the sound generation instruction.

Figure 25:
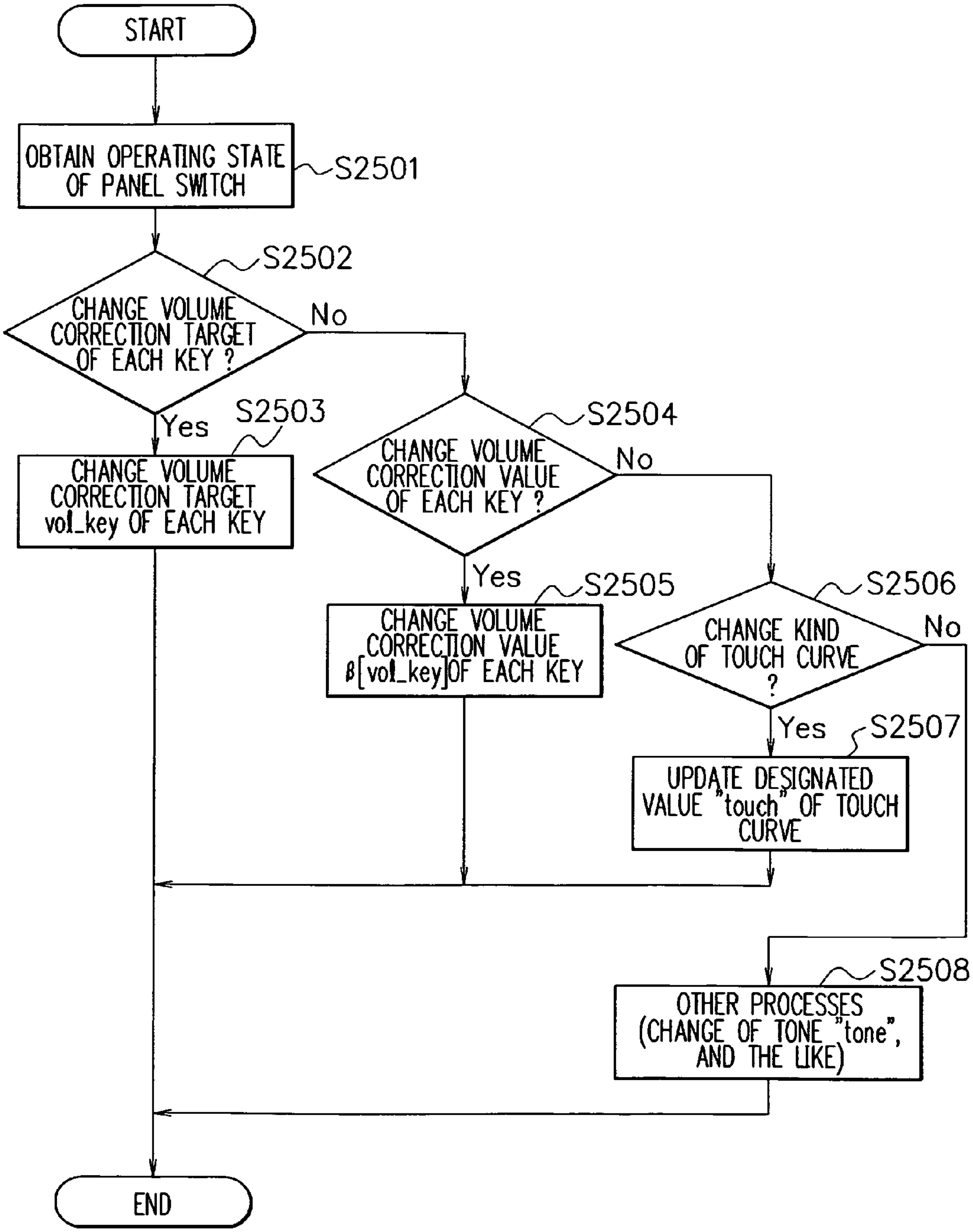
FIG. 25 is a flow chart showing details of a panel operation interpreting process of a step S2204 in FIG. 22.

FIG. 25 is a flow chart showing details of the panel operation interpreting process of the step S2204 in FIG. 22. First, in a step S2501, the CPU 101 obtains the operating state of the panel switch 104 via the panel switch state detection unit 105. By operating the panel switch 104, a user can designate a key to be volume corrected, the volume correction value, or the kind of touch curves (FIG. 10). Next, in a step S2502, the CPU 101 judges whether or not to change the volume correction target of each key, according to the operating state of the above-described panel switch 104. When the correction target is changed, the process goes to a step S2503, and when it is not changed, the process goes to a step S2504. In the step S2503, the CPU 101 updates a key number vol_key of the volume correction target of each key according to the operating state of the panel switch 104, and terminates the process. In the step S2504, the CPU 101 judges whether or not to change the volume correction value of each key according to the operating state of the above-described panel switch 104. When the correction value is changed, the process goes to a step S2505, and when it is not changed, the process goes to a step S2506. In the step S2505, the CPU 101 updates a volume correction value β [vol_key] of each key according to the operating state of the panel switch 104, and terminates the process. In the step S2506, the CPU 101 judges whether or not to change the kind of touch curves according to the operating state of the panel switch 104. When the kind of touch curves is changed, the process goes to a step S2507, and when it is not changed, the process goes to a step S2508. In the step S2507, the CPU 101 updates a designated value "touch" of the touch curve according to the operating state of the panel switch 104, and terminates the process. In the step S2508, the CPU 101 conducts other processes (change of tone number "tone", and the like) according to the operating state of the panel switch 104, and terminates the process.

An update and recording of the volume correction value β [vol_key] of each key used in the process of the present embodiment, a parameter "touch" designating the kind of touch curves common to all keys, a parameter "tone" designating the tone such as a piano and an organ, and the like, are conducted here. The vol_key indicating a key to be a volume correction target is made to correspond to the key numbers 0 (zero) to 87 one to one, same as the key variable "key" described before, in which the correction value can be set by each key. At this time, a value that targets all the keys may be set. For example, it is configured such that a value of the key number 88 or larger can be set as the key variable "key", in which after the set value of 88 or larger is inputted, the same amount of correction is added or subtracted to or from all the correction values β [0 (zero)] to β [87].

The touch curves are previously prepared in which, for example, the touch curve 1001, the touch curve 1002, and the touch curve 1003 in FIG. 10 are set as a light touch curve tch_tblL [ ], a standard touch curve tch_tblM [ ], and a heavy touch curve tch_tblH [ ], respectively. The parameter "touch" indicating the kind of touch curves records 1, 2, and 3 when designating the light touch curve 1001, the standard touch curve 1002, and the heavy touch curve 1003, respectively.

Although detailed explanations are omitted, it is allowable that also the parameter "tone" designating the tone and a parameter whose explanation is omitted are set so that a corresponding item and the set value corresponds to each other one to one in the same manner, which are then recorded appropriately.

Figure 26:
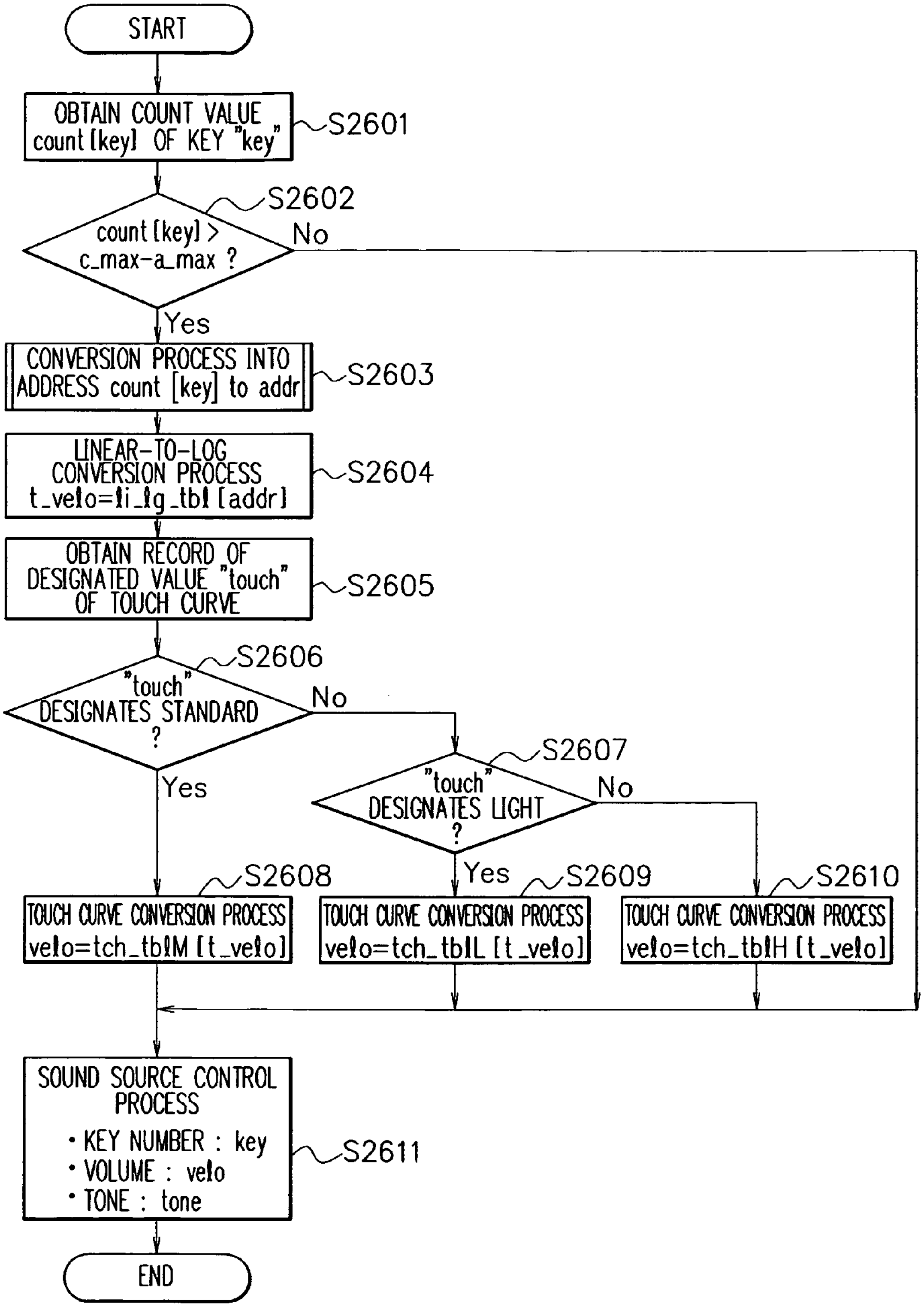
FIG. 26 is a flow chart showing details of a sound generation event process of a step S2403 in FIG. 24.

FIG. 26 is a flow chart showing details of the sound generation event process of the step S2403 in FIG. 24. First, in a step S2601, the CPU 101 obtains a count value count [key] of the key variable "key" corresponding to the period of time from the time ta to the time tb in FIG. 5 via the key touch detection unit 103. Next, in a step S2602, the CPU 101 judges whether the above-described count [key] is larger than c_max−a_max or not, as shown in FIG. 7 and FIG. 8. If the count [key] is larger than c_max−a_max, the process goes to a step S2603, and if it is not, the process goes to a step S2611. In the step S2603, the CPU 101 converts the above-described count value count [key] into an address "addr", as shown in FIG. 8. Next, in a step S2604, the CPU 101 converts the address "addr" into an intermediate velocity t_velo (=li_lg_tbl [addr]) using a linear-to-log conversion table li_lg_tbl [ ], as shown in FIG. 16 or FIG. 17. Next, in a step S2605, the CPU 101 obtains a record of the designated value "touch" of the touch curve. Next, in a step S2606, the CPU 101 judges whether the designated value "touch" of the touch curve designates the standard touch curve or not. When the standard touch curve is designated, the process goes to a step S2608, and when it is not designated, the process goes to a step S2607. In the step S2608, the CPU 101 converts the intermediate velocity t_velo into a final velocity velo (=tch_tblM [t_velo]) using the standard touch curve tch_tblM [ ], as shown in FIG. 10, and the process goes to a step S2611. In the step S2607, the CPU 101 judges whether the designated value "touch" of the touch curve designates the light touch curve or not. When the light touch curve is designated, the process goes to a step S2609, and when it is not designated, the process goes to a step S2610. In the step S2609, the CPU 101 converts the intermediate velocity t_velo into a final velocity velo (=tch_tblL [t_velo]) using the light touch curve tch_tblL [ ], as shown in FIG. 10, and the process goes to the step S2611. In the step S2610, the CPU 101 converts the intermediate velocity t_velo into a final velocity velo (=tch_tblH [t_velo]) using the heavy touch curve tch_tblH [ ], as shown in FIG. 10, and the process goes to the step S2611. In the step S2611, the CPU 101 makes the sound source circuit 109 to generate the audio signal based on the key number "key", the volume (final velocity) "velo", and the tone "tone", and a sound is generated from the speaker 112.

Here, at first, as same as in FIG. 23, regarding the designated key variable "key", the count value count [key] corresponding to a time during which the shutter 202 crosses the two key switches S1 and S2 corresponding to the key variable "key" is obtained. Next, the conversion of the count value into the address value explained in FIG. 8 is conducted, to thereby obtain the address "addr". Since this conversion is simple, it can be performed by the program, or by referring a count value to address value conversion table ct_addr_tbl [ ] which is previously prepared, using the count value count [key]. Further, by referring the linear-to-log conversion table ln_lg_tbl [ ] explained in FIG. 9 using the address "addr", the intermediate velocity t_velo can be obtained.

Thereafter, the designated value "touch" of the kind of touch curves recorded in the process in FIG. 25 is obtained, and which among the light touch curve tch_tblL [ ], the standard touch curve tch_tblM [ ], and the heavy touch curve tch_tblH [ ] which are previously recorded should be referred is recognized. When the kind of touch curves is determined, by converting the intermediate velocity t_velo which is determined earlier, using the kind of touch curves, a final velocity velo as an amount of sound generation used in a sound source control can be determined.

Finally, the CPU 101 generates a necessary parameter by referring to the values of the key number "key", the volume (final velocity) "velo", and the tone designation "tone" recorded in the process in FIG. 25, and outputs it to the sound source circuit 109. Here, since the parameter to be outputted to the sound source circuit 109 differs depending on the sound source circuit 109 to be used, explanations will be omitted here.

Figure 27:
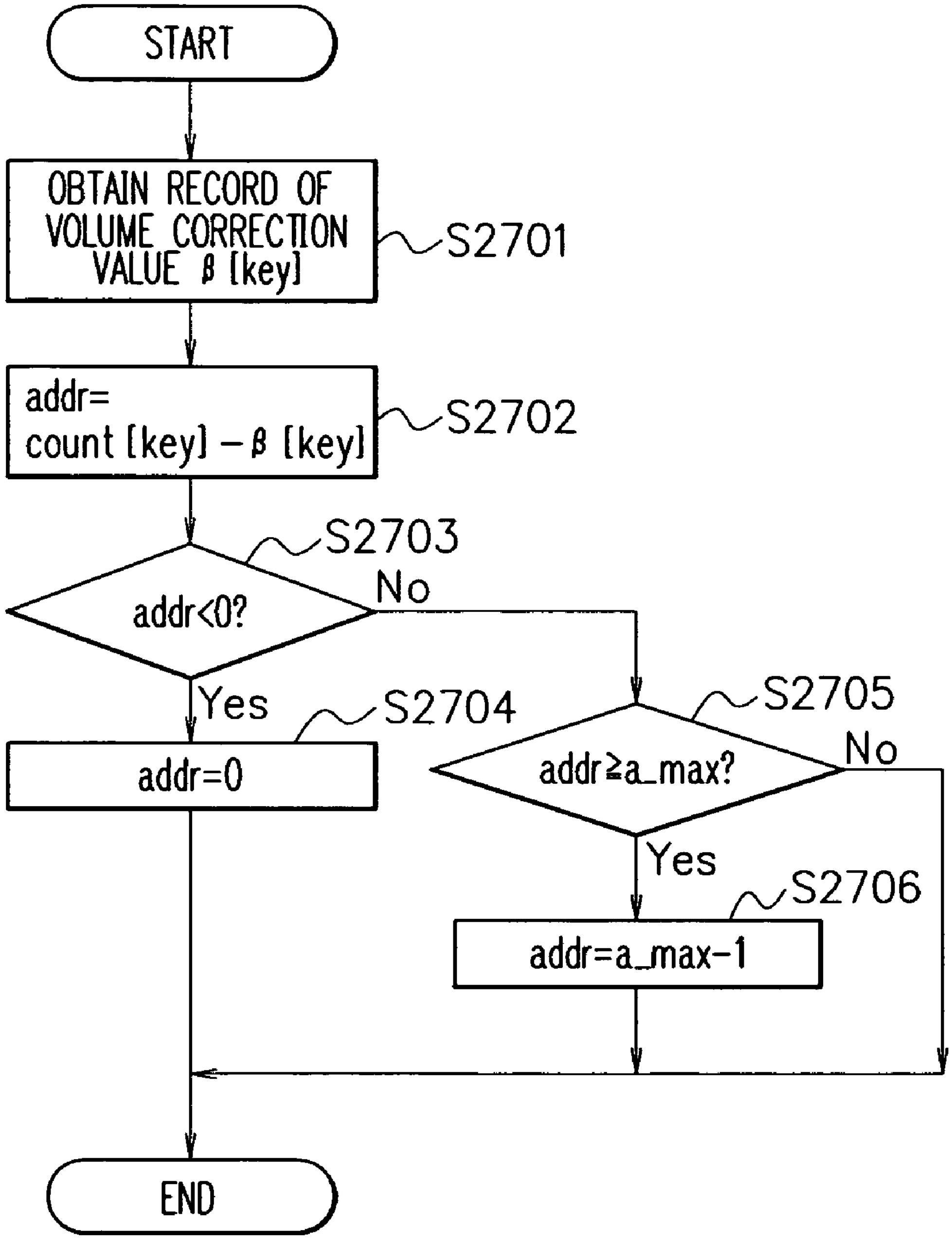
FIG. 27 is a flow chart showing details of an address conversion process of a step S2603 in FIG. 26.

FIG. 27 is a flow chart showing details of the address conversion process of the step S2603 in FIG. 26, and is a processing example of a case where a process is conducted so as to parallel shift the apparent linear-to-log conversion table, using the method described in FIG. 16. First, in a step S2701, the CPU 101 obtains a record of the volume correction value β [key] of the key variable "key". Next, in a step S2702, the CPU 101 calculates an address "addr" (=count [key]=β [key]) by subtracting the correction value β [key] from the count value count [key]. Next, in a step S2703, the CPU 101 judges whether the address "addr" is smaller than 0 (zero) or not. When the address "addr" is smaller than 0 (zero), the process goes to a step S2704, and when it is not, the process goes to a step S2705. In the step S2704, the CPU 101 sets the address "addr" to 0 (zero), and terminates the process. In the step S2705, the CPU 101 judges whether or not the address "addr" is the maximum value a_max or larger. When the address "addr" is the maximum value a_max or larger, the process goes to a step S2706, and when it is not, the process is terminated. In the step S2706, the CPU 101 sets the address "addr" to a value of (a_max−1), and terminates the process.

As described above, first, regarding the key variable "key" to be a target of process, the volume correction value β [key] of each key recorded in the process in FIG. 25 is determined, and it is subtracted from the count value count [key], to thereby obtain the address "addr" for referring the linear-to-log conversion tale. At last, a process for limiting the address "addr" to fall within a range of 0 (zero) to 127 is performed, so that the address "addr" does not exceed a range of the linear-to-log conversion table.

Figure 28:
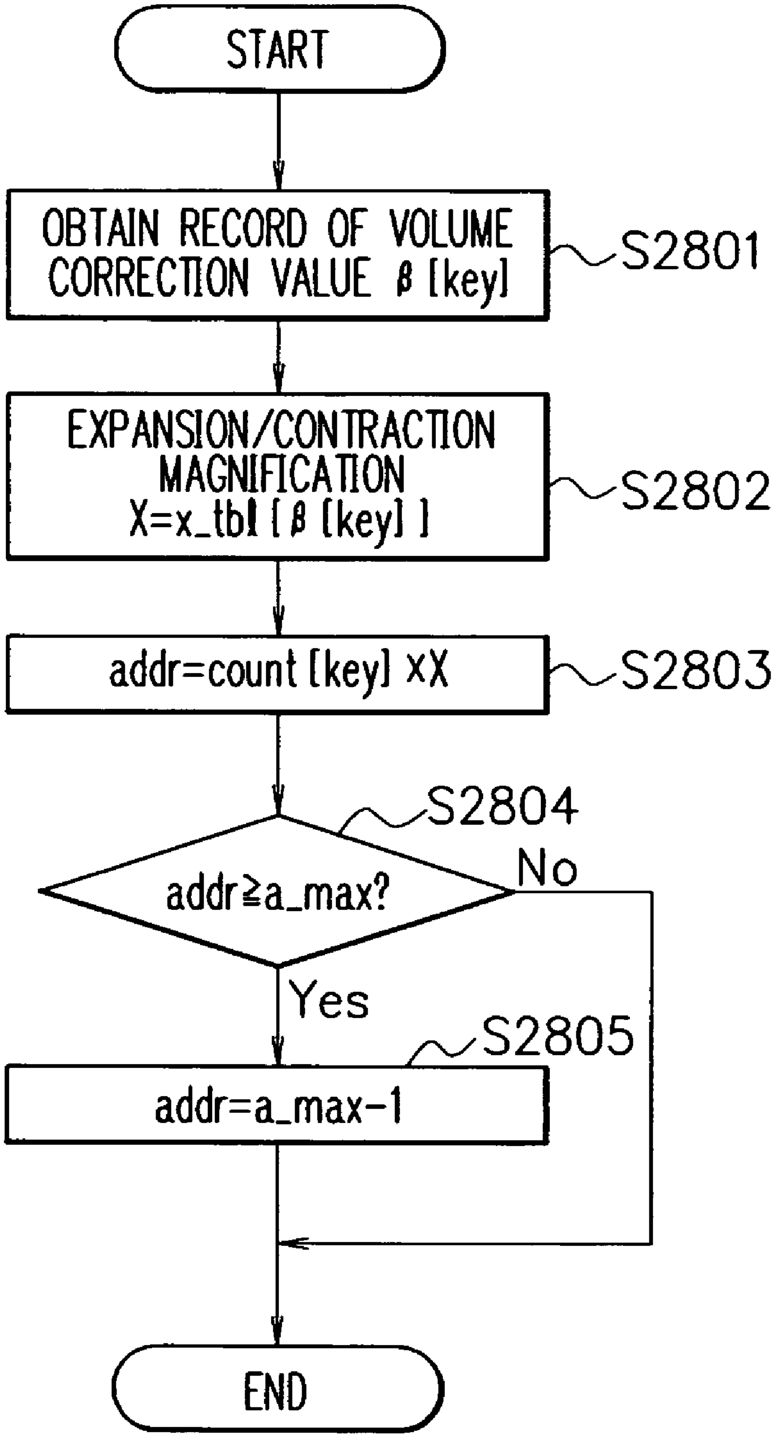
FIG. 28 is a flow chart showing details of another address conversion process of the step S2603 in FIG. 26.

FIG. 28 is a flow chart showing details of another address conversion process of the step S2603 in FIG. 26, and is a processing example of a case where a process is conducted so as to expand/contract the apparent linear-to-log conversion table, using the method described in FIG. 17. First, in a step S2801, the CPU 101 obtains a record of the volume correction value β [key] of the key variable "key". Next, in a step S2802, the CPU 101 converts the correction value β [key] into an expansion/contraction magnification X (=x_tbl [β[key]]) using a conversion table x_tbl [ ], as shown in FIG. 18. Next, in a step S2803, the CPU 101 calculates an address "addr" (=count [key]×X) by multiplying the count value count [key] by the expansion/contraction magnification X. Next, in a step S2804, the CPU 101 judges whether or not the address "addr" is the maximum value a_max or larger. When the address "addr" is the maximum value a_max or larger, the process goes to a step S2805, and when it is not, the process is terminated. In the step S2805, the CPU 101 sets the address "addr" to a value of (a_max−1), and terminates the process.

As described above, first, regarding the key variable "key" to be a target of process, the volume correction value β [key] of each key recorded in the process in FIG. 25 is determined, and further, by referring the volume correction value to expansion/contraction magnification conversion table x_tbl [ ] described in FIG. 18 using the correction value β[key], the expansion/contraction magnification X is determined. Further, the count value count [key] is multiplied by the determined expansion/contraction magnification X, to thereby obtain the address "addr" for referring the linear-to-log conversion table. At last, a process for limiting the address "addr" to fall within a range of 0 (zero) to 127 is performed, so that the address "addr" does not exceed a range of the linear-to-log conversion table. Since the conversion magnification X is set in a range of positive values, when the calculation result becomes 0 (zero) or smaller, the limiting process is unnecessary.

As described above, the electronic keyboard instrument of the present embodiment has the keyboard 102 having a plurality of keys, and a first switch S1 and a second switch S2 provided corresponding to each key of the keyboard 102 and being sequentially turned on at a time interval corresponding to a key depression speed of the keyboard 102. A counting unit 1902 (key touch detection unit 103) counts, in a counting step, a count value corresponding to the time interval during which the first switch S1 and the second switch S2 are sequentially turned on. A correcting unit corrects, in a correcting step, the count value or a value corresponding to the count value based on a variation of the time interval. Specifically, the correcting unit converts the count value into an address, and then corrects the address. A velocity conversion unit includes the linear-to-log conversion table 1905 and the touch conversion tables 1910 to 1912, and converts, in a velocity conversion step, the corrected value into a velocity.

The correcting unit performs a correction so that a correction target value a_end corresponding to a minimum value of the velocity (0 (zero), for example) and a correction target value a_top corresponding to a maximum value of the velocity (127, for example) are shifted, as shown in FIG. 16 and FIG. 17.

In cases of FIG. 16, FIG. 20 and FIG. 27, the correcting unit performs a correction by adding or subtracting the correction value β to or from the count value or the value corresponding to the count value. Specifically, the correcting unit adds or subtracts the correction value of each depressed key of the keyboard 102. Further, the storage unit 2001 stores the correction value of each key of the keyboard 102.

In cases of FIG. 17, FIG. 21 and FIG. 28, the correcting unit performs a correction by multiplying the count value or the value corresponding to the count value by the correction magnification X. Specifically, the correcting unit multiplies the correction magnification X of each depressed key of the keyboard 102. Further, the correcting unit converts the correction value β of each key of the keyboard 102 into the correction magnification X, and then multiplies the correction magnification X. Further, the storage unit 2001 stores the correction value β of each key of the keyboard 102.

In cases of FIG. 2 and FIGS. 12A and 12B, the first switch S1 and the second switch S2 are sequentially turned on at a time interval corresponding to the movement speed of the hammer 204 that moves in accordance with the key depression of the keyboard 102. Further, in cases of FIGS. 13A to 13D, the first switch S1 and the second switch S2 are sequentially turned on at a time interval corresponding to the movement speed of the key 1301 that moves in accordance with the key depression of the keyboard 102.

According to the present embodiment, a conversion into the accurate velocity and a volume control can be conducted, even when a variation in time intervals during which the first switch S1 and the second switch S2 are sequentially turned on exists, due to a problem of attaching the first switch S1 and the second switch S2, or the problem of attaching the shutter 202.

The present embodiment can be realized by a computer (electronic keyboard instrument) when it executes a program. Further, a means to supply the program to the computer such as, for example, a computer-readable recording medium such as a CD-ROM which records such program, or a transmission medium such as an internet which transmits such program, is also applicable as an embodiment of the present invention. Further, a computer program product such as a computer-readable recording medium which records the above-described program is also applicable as an embodiment of the present invention. The above-described program, the recording medium, the transmission medium and the computer program product are included in a range of the present invention. As the recording medium, for example, a flexible disk, a hard disk, an optical disk, a magnetic optical disk, a CD-ROM, a magnetic tape, a nonvolatile memory card, a ROM, and so on can be used.

Even when the variation in time intervals during which the first and the second switches are sequentially turned on exists, due to the problem of attaching the first switch and the second switches and the like, the conversion into the accurate velocity and the volume control can be conducted.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An electronic keyboard instrument, comprising:

a keyboard having a plurality of keys;

a first and a second switches provided corresponding to each key of said keyboard and being sequentially turned on at a time interval corresponding to a key depression speed of said keyboard;

a counting unit for counting a count value corresponding to the time interval during which said first and said second switches are sequentially turned on;

a correcting unit for correcting the count value or a value corresponding to the count value based on a variation of the time interval; and a velocity conversion unit for converting the corrected value into a velocity, wherein the velocity conversion unit comprises a linear-to-log conversion table representing a logarithmic function to be applied to the count value to obtain a corresponding velocity, and wherein the velocity conversion unit performs a look-up of the linear-to-log conversion table based on the corrected value such that, according to the logarithmic function, the converted velocity corresponds to a modified count value with respect to the count value obtained by the counting unit.

2. The electronic keyboard instrument according to claim 1, wherein said correcting unit converts the count value into an address for the linear-to-log conversion table, and then corrects the address.

3. The electronic keyboard instrument according to claim 1, wherein said correcting unit performs a correction that effectively modifies the logarithmic function by shifting a target count value corresponding to a minimum value of the velocity and a target count value corresponding to a maximum value of the velocity.

4. The electronic keyboard instrument according to claim 3, wherein said correcting unit performs a correction by adding or subtracting a correction value to or from the count value or the value corresponding to the count value.

5. The electronic keyboard instrument according to claim 4, wherein said correcting unit adds or subtracts a correction value to or from the count value of the value corresponding to the count value for each depressed key of said keyboard.

6. The electronic keyboard instrument according to claim 5, further comprising a storage unit for storing the correction value of each depressed key of said keyboard.

7. The electronic keyboard instrument according to claim 3, wherein said correcting unit performs a correction by multiplying the count value or the value corresponding to the count value by a correction magnification.

8. The electronic keyboard instrument according to claim 7, wherein said correcting unit multiplies a correction magnification with the count value or the value corresponding to the count value for each depressed key of said keyboard.

9. The electronic keyboard instrument according to claim 8, wherein said correcting unit converts the correction value of each depressed key of said keyboard into the correction magnification, and then multiplies the correction magnification with the count value or the value corresponding to the count value for the depressed key.

10. The electronic keyboard instrument according to claim 9, further comprising a storage unit for storing the correction value of each depressed key of said keyboard.

11. The electronic keyboard instrument according to claim 1, wherein said first and said second switches are sequentially turned on at a time interval corresponding to a movement speed of a hammer that moves in accordance with a key depression of said keyboard.

12. The electronic keyboard instrument according to claim 1, wherein said first and said second switches are sequentially turned on at a time interval corresponding to a movement speed of a key that moves in accordance with a key depression of said keyboard.

13. A processing method of an electronic keyboard instrument having a keyboard provided with a plurality of keys, and a first and a second switches provided corresponding to each key of the keyboard and being sequentially turned on at a time interval corresponding to a key depression speed of the keyboard, comprising:

a counting step for counting a count value corresponding to the time interval during which the first and the second switches are sequentially turned on;

a correcting step for correcting the count value or a value corresponding to the count value based on a variation of the time interval; and a velocity conversion step for converting the corrected value into a velocity using a linear-to-log conversion table representing a logarithmic function to be applied to the count value to obtain a corresponding velocity, wherein the velocity conversion step performs a look-up of a linear-to-log conversion table based on the corrected value such that, according to the logarithmic function, the converted velocity corresponds to a modified count value with respect to the count value obtained by the counting step.

14. The processing method according to claim 13, wherein said correcting step includes converting the count value into an address for the linear-to-log conversion table, and correcting the address.

15. The processing method according to claim 13, wherein said correcting step effectively modifies the logarithmic function by shifting a target count value corresponding to a minimum value of the velocity and a target count value corresponding to a maximum value of the velocity.

16. The processing method according to claim 15, wherein said correcting step includes adding or subtracting a correction value to or from the count value or the value corresponding to the count value.

17. The processing method according to claim 15, wherein said correcting step includes multiplying the count value or the value corresponding to the count value by a correction magnification.

18. The processing method according to claim 13, further comprising:

storing the correction value in a storage unit corresponding to the depressed key, wherein the correcting step includes obtaining the correction value from the storage unit.

19. The processing method according to claim 13, wherein said first and said second switches are sequentially turned on at a time interval corresponding to a movement speed of a hammer that moves in accordance with a key depression of said keyboard.

20. The processing method according to claim 13, wherein said first and said second switches are sequentially turned on at a time interval corresponding to a movement speed of a key that moves in accordance with a key depression of said keyboard.

* * * * *